United States Patent
Xu et al.

(10) Patent No.: US 11,505,502 B2
(45) Date of Patent: Nov. 22, 2022

(54) HYBRID MULTIFUNCTIONAL COMPOSITE MATERIAL AND METHOD OF MAKING THE SAME

(71) Applicants: Florida State University Research Foundation, Inc., Tallahassee, FL (US); The Government of the United States of America as represented by the Secretary of the Navy, Arlington, VA (US)

(72) Inventors: Chengying Xu, Tallahassee, FL (US); William C. Nickerson, Ashburn, VA (US)

(73) Assignees: Florida State University Research Foundation, Inc., Tallahassee, FL (US); The Government of the United States of America, as represented by the Secretary of the Navy, Arlington, VA (US)

( * ) Notice: Subject to any disclaimer, the term of this patent is extended or adjusted under 35 U.S.C. 154(b) by 495 days.

(21) Appl. No.: 15/791,661

(22) Filed: Oct. 24, 2017

(65) Prior Publication Data
US 2018/0111338 A1    Apr. 26, 2018

Related U.S. Application Data

(60) Provisional application No. 62/411,936, filed on Oct. 24, 2016.

(51) Int. Cl.
*B32B 9/00* (2006.01)
*C04B 35/80* (2006.01)
(Continued)

(52) U.S. Cl.
CPC .............. *C04B 35/80* (2013.01); *B29C 70/30* (2013.01); *B29C 70/78* (2013.01); *B32B 5/022* (2013.01);
(Continued)

(58) Field of Classification Search
CPC ... B82Y 30/00; Y10T 428/30; Y10S 977/742; B32B 9/007
(Continued)

(56) References Cited

U.S. PATENT DOCUMENTS

| 4,726,099 A | * | 2/1988 | Card | H01L 41/37 |
| | | | | 252/62.9 R |
| 2002/0106514 A1 | * | 8/2002 | Lafdi | C04B 35/83 |
| | | | | 428/408 |

(Continued)

OTHER PUBLICATIONS

Downes, et. al., "Geometrically Constrained Self-Assembly and Crystal Packing of Flattened and Aligned Carbon Nanotubes," Carbon, 2015, 93, pp. 953-966.
(Continued)

*Primary Examiner* — Daniel H Miller
(74) *Attorney, Agent, or Firm* — Eversheds Sutherland (US) LLP

(57) ABSTRACT

Hybrid composite materials including carbon nanotube sheets and flexible ceramic materials, and methods of making the same are provided herein. In one embodiment, a method of forming a hybrid composite material is provided, the method including: placing a layer of a first flexible ceramic composite on a lay-up tooling surface; applying a sheet of a pre-preg carbon fiber reinforced polymer on the flexible ceramic composite; curing the flexible ceramic composite and the pre-preg carbon fiber reinforced polymer sheet together to form a hybrid composite material; and removing the hybrid composite material from the lay-up (Continued)

tooling surface, wherein the first flexible ceramic composite comprises an exterior surface of the hybrid composite material.

13 Claims, 21 Drawing Sheets

(51) Int. Cl.
B29C 70/30 (2006.01)
C04B 41/50 (2006.01)
C04B 41/85 (2006.01)
C04B 41/45 (2006.01)
B32B 5/02 (2006.01)
B32B 18/00 (2006.01)
C04B 35/589 (2006.01)
B29C 70/78 (2006.01)
B82Y 30/00 (2011.01)

(52) U.S. Cl.
CPC .............. B32B 9/007 (2013.01); B32B 18/00 (2013.01); C04B 35/589 (2013.01); C04B 41/4501 (2013.01); C04B 41/5001 (2013.01); C04B 41/85 (2013.01); B82Y 30/00 (2013.01); C04B 2235/3217 (2013.01); C04B 2235/5288 (2013.01); C04B 2235/616 (2013.01); C04B 2235/77 (2013.01); C04B 2235/95 (2013.01); C04B 2235/96 (2013.01); C04B 2235/9607 (2013.01); C04B 2235/9615 (2013.01); C04B 2235/9684 (2013.01); C04B 2237/365 (2013.01); C04B 2237/368 (2013.01); C04B 2237/38 (2013.01); Y10T 428/30 (2015.01)

(58) Field of Classification Search
USPC ......................................................... 428/408
See application file for complete search history.

(56) References Cited

U.S. PATENT DOCUMENTS

| | | | |
|---|---|---|---|
| 2006/0057361 A1* | 3/2006 | Ounaies | ................. B32B 27/20 428/323 |
| 2010/0264562 A1* | 10/2010 | Matviya | ................ C04B 38/064 264/257 |
| 2012/0208002 A1* | 8/2012 | Todd | ..................... B82Y 30/00 428/221 |
| 2016/0176156 A1 | 6/2016 | Xu | |
| 2017/0058407 A1 | 3/2017 | Xu | |
| 2017/0095981 A1 | 4/2017 | Xu | |
| 2017/0341297 A1 | 11/2017 | Xu | |

OTHER PUBLICATIONS

Downes, et. al.,"Strain-Induced Alignment Mechanisms of Carbon Nanotube Networks," Adv. Eng. Mater., 2015, 17(3):349-58.

* cited by examiner

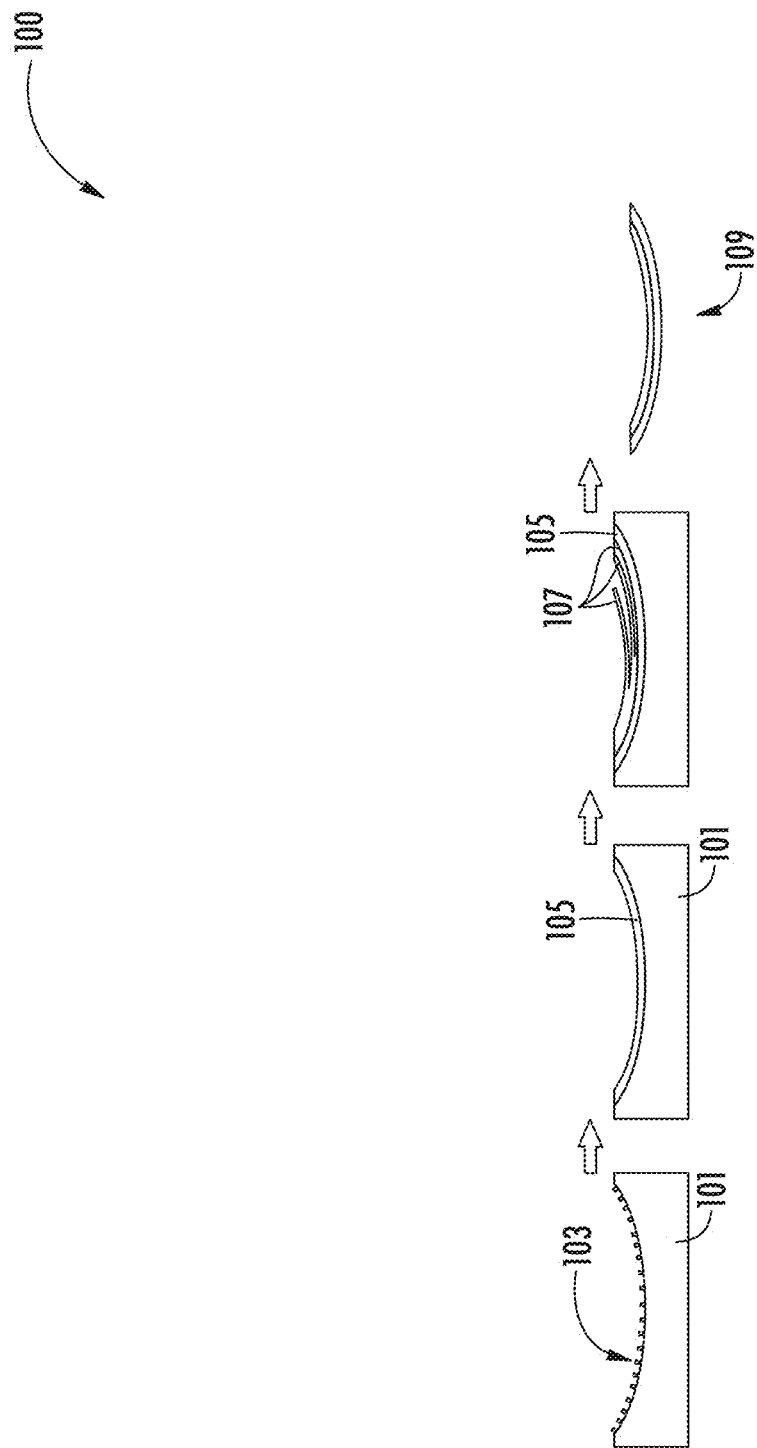

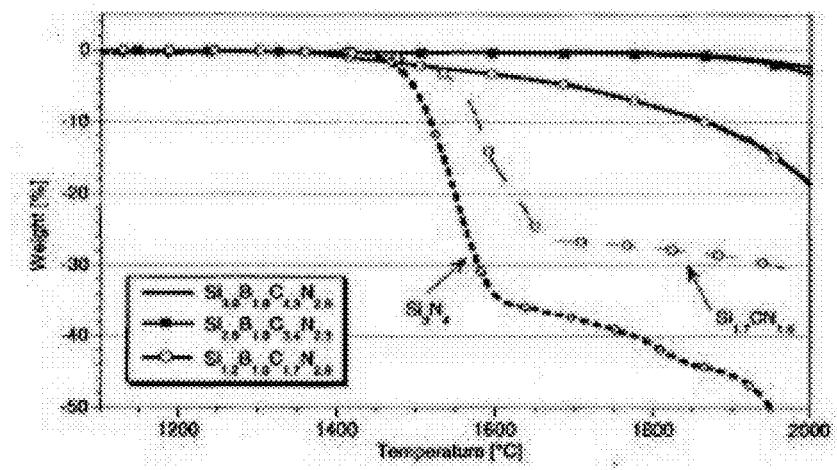
FIG. 22
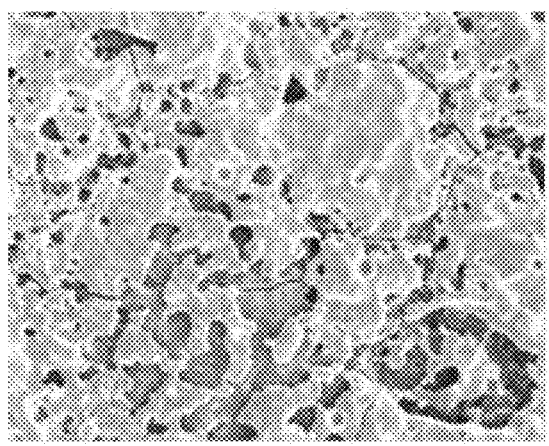 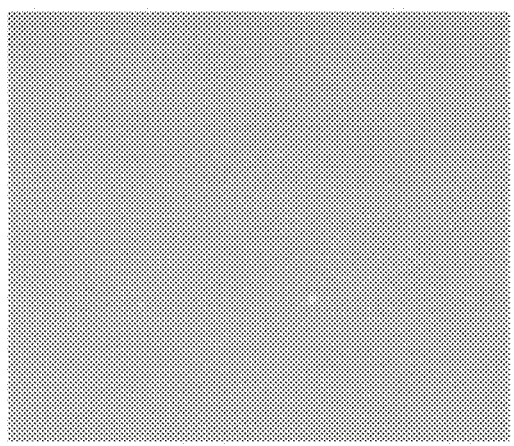
FIG. 23A  FIG. 23B

HYBRID MULTIFUNCTIONAL COMPOSITE MATERIAL AND METHOD OF MAKING THE SAME

CROSS-REFERENCE TO RELATED APPLICATIONS

This application claims priority to U.S. Provisional Patent Application No. 62/411,936, filed Oct. 24, 2016, the disclosure of which is hereby incorporated by reference in its entirety.

STATEMENT REGARDING FEDERALLY RESEARCH OR DEVELOPMENT

This invention was made with government support under contract numbers N00014-11-1-0706 and N00014-14-1-0543 awarded by the Office of Naval Research. The government has certain rights in the invention.

BACKGROUND

Ceramic materials are widely used in both civil and military fields for structural and functional applications. High temperature resistance and outstanding mechanical properties are among the advantages of ceramic materials, while poor toughness and crucial processing conditions for preparation may be a weakness in certain circumstances. Despite these weaknesses, for certain specific applications, such as fairings in missiles and airplanes, rocket nozzles, and some brake pads, ceramic materials may be preferred.

Ceramic composites typically include a ductile phase embedded in ceramic material. Ceramic composites represent a technology with multiple potentially desired properties for applications such as jet engines and lightweight cars.

Recently, it has become more desirable to provide compliant and flexible ceramic composites for advanced applications. The ability to deform flexibly in ceramic materials is of profound interest for advanced specific applications, such as thermal protection system and battery materials. However, strong ionic/covalent bonding typically results in conventional ceramic composites having high mechanical properties while suffering from low flexibility. Minuscule ceramic objects have been created which demonstrate the ability to deform to large strains recoverably. Large-sized flexible ceramics materials are also needed for macro-applications.

Carbon fiber reinforced polymer (CFRP) composites (also known as polymer matrix composites (PMC)) are a type of strong and light weight composite material, that is commonly used in the aerospace, automotive and civil engineering fields. For example, the Boeing 787 aircraft is designed with fuselage, wing, and other key airframe components made from CFRP composite material. However, such material has two inherent drawbacks which limit its viability in numerous commercial uses, and particularly in naval applications:

(1) The operating temperature is not high enough for many uses. For example, the most common matrix materials for CFRP composites are epoxy and bismaleimides (BMI), whose glass transition temperatures are about 75° C. and 260° C., respectively. Such polymer matrices will not perform as desired in higher temperature due to thermal softening effect: strength and modulus degradation are typical phenomena. Cracks and fracture phenomenon may develop as well after long duration.

(2) The chemical stability is not sufficient for long product lifespans. For example, the lifespan for CFRP material is limited under UV light radiation and harsh weather conditions, such as high moisture or salinity conditions, as may be encountered in aerospace applications, or particularly in naval applications.

These weaknesses greatly constrain CFRP composite applications to limited working environments. Thus, improved materials which overcome the drawbacks of common ceramic materials and CFRP composite materials are desired. In some aspects, materials with increased thermal conductivity for flame resistance, low water absorption, and electromagnetic interference (EMI) shielding capability are desired.

SUMMARY

This summary is provided to introduce various concepts in a simplified form that are further described below in the detailed description. This summary is not intended to identify required or essential features of the claimed subject matter nor is the summary intended to limit the scope of the claimed subject matter.

This summary and the following detailed description provide examples and are explanatory only of the invention. Accordingly, the foregoing summary and the following detailed description should not be considered to be restrictive. Additional features or variations thereof can be provided in addition to those set forth herein, such as for example, various feature combinations and sub-combinations of these described in the detailed description.

In one aspect, a method of forming a hybrid composite material is provided which includes placing a layer of a first flexible ceramic composite on a lay-up tooling surface; applying a sheet of a pre-preg carbon fiber reinforced polymer on the flexible ceramic composite; curing the flexible ceramic composite and the pre-preg carbon fiber reinforced polymer sheet together to form a hybrid composite material; and removing the hybrid composite material from the lay-up tooling surface, wherein the first flexible ceramic composite comprises an exterior surface of the hybrid composite material. In some embodiments, the method of forming a hybrid composite material further includes applying one or more sheets of non-woven carbon nanotube tissue on the first flexible ceramic composite; and curing the first flexible ceramic composite and the carbon nanotube tissue together to form a second flexible ceramic composite before applying the sheet of pre-preg carbon fiber reinforced polymer on the second flexible ceramic composite.

In another aspect, a hybrid composite material is provided including at least one layer of a first flexible ceramic composite; and at least one layer of a carbon fiber reinforced polymer attached to the at least one layer of flexible ceramic composite, wherein the at least one layer of the first flexible ceramic composite comprises an exterior surface of the hybrid composite material. In some embodiments, the hybrid composite material further includes at least one layer of non-woven carbon nanotube tissue between the first flexible ceramic composite and the carbon fiber reinforced polymer.

BRIEF DESCRIPTION OF THE DRAWINGS

The following figures form part of the present specification and are included to further demonstrate certain aspects of the present disclosure. The invention may be better understood by reference to one or more of these figures in combination with the detailed description of specific aspects presented herein.

FIG. 1 is a schematic illustration of a method of producing a hybrid multifunctional composite material according to an embodiment of the present disclosure.

FIG. 22 is a graph depicting the TGA of polymer-derived SiCN, SiBCN and commercial silicon nitride.

FIG. 23A is an SEM image of the surface of a typical silicon-based ceramic without Al-doping after heat-treatment in water vapor environments.

FIG. 23B is an SEM image of a polymer-derived SiAlCN ceramic after annealing at 1400° C. for 300 hours in 50% $H_2O$-50% $O_2$.

DETAILED DESCRIPTION

Figure 2A:
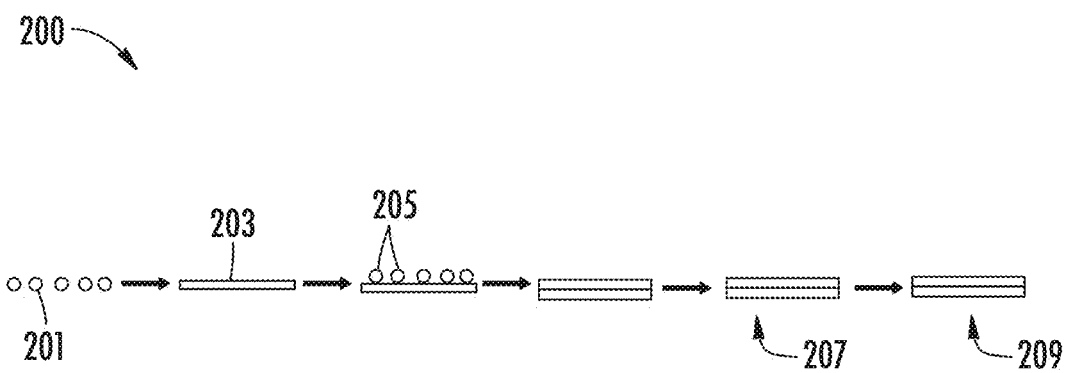
FIG. 2A is a schematic illustration of a method of producing a carbon nanotube (CNT) ceramic matrix composite according to an embodiment of the present disclosure.

A hybrid multifunctional material and methods of making the same which overcome one or more of the above-described disadvantages are provided herein. In a preferred embodiment, the hybrid composite material includes at least one layer of flexible ceramic composite, and at least one layer of a carbon fiber reinforced polymer attached to the at least one layer of flexible ceramic composite, wherein the at least one layer of flexible ceramic composite comprises an exterior surface of the hybrid composite material. In some embodiments, the at least one layer of flexible ceramic composite may be attached to the at least one layer of a carbon fiber reinforced polymer by a transition layer containing one or more nonwoven carbon fiber tissues and ceramic. The hybrid multifunctional material may include other materials, including but not limited to other polymer and/or metal containing composite materials, in addition to or in place of the carbon fiber reinforced polymer. In particular embodiments, the at least one layer of flexible ceramic composite is disposed an exterior surface so as to shield the other materials from harsh environments.

The hybrid composite material can be produced by a variety of processes, which may include known molding, curing, and other composite manufacturing techniques. In one embodiment, the hybrid composite material is made by process that includes the steps of: placing a layer of a flexible ceramic composite on a lay-up tooling surface; applying a sheet of a pre-preg carbon fiber reinforced polymer on the flexible ceramic material; curing the flexible ceramic material and the pre-preg carbon fiber reinforced polymer sheet together to form a hybrid composite material; and then removing the hybrid composite material from the lay-up tooling surface, wherein the flexible ceramic composite comprises an exterior surface of the hybrid composite material. In another embodiment, the hybrid composite material is made by process that includes the steps of: placing a layer of a flexible ceramic composite on a lay-up tooling surface; applying a non-woven carbon fiber tissue on the flexible ceramic material; applying a sheet of a pre-preg carbon fiber reinforced polymer on the flexible ceramic material; curing the flexible ceramic material, the non-woven carbon fiber tissue, and the pre-preg carbon fiber reinforced polymer sheet together to form a hybrid composite material; and then removing the hybrid composite material from the lay-up tooling surface, wherein the flexible ceramic composite comprises an exterior surface of the hybrid composite material Advantageously, in some aspects the hybrid multifunctional material comprises at least one ceramic composite material with a coefficient of thermal expansion substantially similar to the coefficient of thermal expansion of the at least one second composite material, such that thermal expansion will not cause the at least one ceramic composite material to separate from the at least one second composite material.

Generally, the ceramic composite material provided herein may enjoy one or more of the following advantages: significantly enhanced strength, modulus, and fracture toughness; the ability to sustain large deformation and maintain flexibility; high electric and thermal conductivities that are comparable to metals; better EMI shielding performance; and sustained performances in extreme environments such as high temperatures, corrosive species, and the like as compared to standard ceramic materials.

Methods of forming the ceramic composite material that include carbon nanotubes and a ceramic material are also provided. In embodiments, the methods may include fabricating flexible ceramic nanocomposites by using an aligned carbon nanotube sheet.

In embodiments, aligned carbon nanotubes can substantially improve the ceramic composites' fracture strength, toughness, stiffness, or a combination thereof. A high volume fraction of aligned carbon nanotubes may make the ceramic composites provided herein have excellent flexibility. For example, in some embodiments, a sample can be bent 180° using fingertip pressure to the point that the two ends of the sample touch each other. After bending deformation, embodiments of the flexible ceramic composites provided herein may be able to fully reflect back to their original shape. The flexural strength and modulus of the sample under flexibility tests may be maintained at a constant level. In one embodiment, no apparent cracks appear on the surface of the ceramic composite materials provided herein after 1000 repetitions of the flexibility test.

In embodiments, the methods of forming a ceramic composite material provided herein comprise infiltrating a carbon nanotube sheet with a first amount of a liquid ceramic precursor; curing the first amount of the liquid ceramic precursor to form a cured ceramic precursor; and pyrolyzing the cured ceramic precursor to form the ceramic composite material.

In some embodiments, the methods of forming a ceramic composite material provided herein comprise mechanically stretching a carbon nanotube sheet to substantially or completely align at least a portion of the carbon nanotubes of the carbon nanotube sheet; infiltrating the aligned carbon nanotube sheet with a first amount of a liquid ceramic precursor; curing the first amount of the liquid ceramic precursor to form a cured ceramic precursor; and pyrolyzing the cured ceramic precursor to form the ceramic composite material.

Generally, aligned carbon nanotubes may enhance thermal/electrical conductivity along the alignment direction, and permit the ceramic composite materials to absorb thermal shock, and reduce temperature gradient under extreme conditions. A high electrical conductivity, which often is needed for multifunctional applications, may be provided, at least in part, by the aligned carbon nanotubes. The electrical conductivity of the ceramic composite materials provided herein may be substantially similar to that of graphite in the basal plane.

In embodiments, the methods of forming a ceramic composite material provided herein comprise infiltrating a carbon nanotube sheet with a first amount of a liquid ceramic precursor; curing the first amount of the liquid ceramic precursor to form a cured ceramic precursor; pyrolyzing the cured ceramic precursor to form the ceramic composite material; infiltrating a second amount of the liquid ceramic precursor into the ceramic composite material; curing the second amount of the liquid ceramic precursor to produce a second amount of a cured ceramic precursor; and pyrolyzing the second amount of the cured ceramic precursor.

In embodiments, the methods of forming a ceramic composite material provided herein comprise mechanically stretching a carbon nanotube sheet to substantially or completely align at least a portion of the carbon nanotubes of the carbon nanotube sheet; infiltrating the aligned carbon nanotube sheet with a first amount of a liquid ceramic precursor; curing the first amount of the liquid ceramic precursor to form a cured ceramic precursor; pyrolyzing the cured ceramic precursor to form the ceramic composite material; infiltrating a second amount of the liquid ceramic precursor into the ceramic composite material; curing the second amount of the liquid ceramic precursor to produce a second amount of a cured ceramic precursor; and pyrolyzing the second amount of the cured ceramic precursor.

Each curing step may be performed by exposing the liquid ceramic precursor to a temperature and for a period of time sufficient to cure the liquid ceramic precursor. In one embodiment, curing the liquid ceramic precursor comprises subjecting the first and/or second amount of the liquid ceramic precursor to a temperature of about 140° C. for about 24 hours.

Each pyrolysis step may be performed by exposing the cured ceramic precursor to a temperature and for a period of time sufficient to pyrolyze the cured ceramic precursor. In embodiments, pyrolyzing the first and/or second amount of the liquid ceramic precursor comprises subjecting the first and/or second amount of the liquid ceramic precursor to a temperature of about 1000° C. in nitrogen atmosphere. The pyrolysis may be performed under a nitrogen atmosphere, but doing so is not necessary.

The liquid ceramic precursor may be selected from any of those known in the art, or combinations thereof. In one embodiment, the liquid ceramic precursor is polysilazane.

The carbon nanotube sheet generally may be formed using any techniques known in the art. The carbon nanotube sheet, in embodiments, comprises substantially aligned carbon nanotubes. The carbon nanotubes may be aligned by subjecting the carbon nanotubes to an aligning force, such as an electric or magnetic field, during formation of the carbon nanotube sheet, by mechanically stretching the carbon nanotube sheet, or any combination thereof. An aligned carbon nanotube sheet may obtained by mechanically stretching a random carbon nanotube sheet.

The carbon nanotube sheet may comprise single-walled carbon nanotubes, multi-walled carbon nanotubes, carbon nanofibers, or any combination thereof. In one embodiment, the carbon nanotube sheet consists of single-walled carbon nanotubes. In another embodiment, the carbon nanotube sheet includes single-walled carbon nanotubes.

The ceramic composite materials provided herein generally may include a relatively high volume fraction of carbon nanotubes. In embodiments, the volume fraction of carbon nanotubes in the ceramic composite material is about 20% to about 90%. In other embodiments, the volume fraction of carbon nanotubes in the ceramic composite material is about 30% to about 80%. In particular embodiments, the volume fraction of carbon nanotubes in the ceramic composite material is about 40% to about 70%. For example, in some embodiments, the volume fraction of carbon nanotubes in the ceramic composite material is about 30%, about 40%, about 50%, about 60%, about 70%, about 80%, or any ranges therebetween.

The ceramic composite materials provided herein may have a relatively high tensile strength. In embodiments, the ceramic composite material has a tensile strength of at least 350 MPa. In other embodiments, the ceramic composite material has a tensile strength of at least 400 MPa. In particular embodiments, the ceramic composite material has a tensile strength of at least 500 MPa. In further embodiments, the ceramic composite material has a tensile strength of at least 600 MPa.

In some embodiments, due to their lightweight, high mechanical strength, excellent high-temperature resistance and chemical inertness, the ceramic composite materials provided herein may play important roles in many defense-related applications, e.g., for liquid-fueled rocket engine combustion devices (thrust chambers and nozzles), aircraft brakes, and thermal protection systems on hypersonic vehicles.

In some embodiments, flexible ceramic membranes, which are useful for high temperature and harsh environment applications are provided. In particular embodiments, the flexible ceramic membranes may exhibit enhanced strength and toughness, great flexibility, good electrical and thermal conductivity, or any combination thereof. These flexible ceramic membranes may be useful in high-temperature heavy metallic components and brittle ceramics in defense-related systems. Alternatively, these flexible ceramic membranes may provide a new template for the design of high-temperature flexible electronics. Examples include, but are not limited to, high-temperature electronic components that are capable of adapting to the shape change of the aerospace components while maintaining key functionality such as sensing and actuating. The material properties of these flexible ceramic membranes, especially the conductivities, can be adjusted, in certain embodiments, both along the in-plane direction and the through-thickness direction, by varying material composition during fabrication process. The ceramic material in the form of a flexible membrane can be used in thermal management, energy, sensing and other harsh extreme environments.

Due to their high electrical conductivity, the ceramic composite materials provided herein are highly desirable for multifunctional applications, such as electromagnetic interference (EMI) shielding. EMI shielding blocks the adverse effects of electromagnetic radiation by using conductive or magnetic shielding materials. The higher the electrical conductivity of the ceramic composite materials, the better EMI shielding performance they provide.

In some aspects, a hybrid multifunctional material is provided which includes a ceramic material and/or methods as disclosed in U.S. Provisional Patent Application No. 62/325,748, which is hereby incorporated herein by reference. In some aspects, the ceramic material is in the form of a film, which exhibits a high tensile strength, in some embodiments about 536 MPa, while demonstrating excellent flexibility, such that a sample can be bent 180° using fingertip pressure to the point that the two ends of the sample touch each other. In some aspects, after releasing the pressure, the flexible ceramic composite is able to fully return to the original shape. In some aspects, the flexural strength and modulus of the sample under flexibility tests remain the same after 1000 times repeated bending tests. In some aspects, no apparent cracks appear on the surface of the flexible ceramic composites after the flexibility test.

Due to the flexibility and strength properties which can be achieved from certain ceramic composites, these ceramic composites may be well-suited to be applied to the tooling surface before a standard pre-impregnated (prepreg) lay-up process. In some aspects, the flexibility of a ceramic composite ensures that the ceramic thin layer may contour to any curvature of a tooling surface geometry without crack or breakage. In some aspects, the ceramic material is a polymer-derived ceramic (PDC), which exhibits excellent high temperature stability, and which resists thermal decomposition and exhibits excellent anti-oxidation behavior.

As illustrated in FIG. 1, a method 100 of making a hybrid multifunctional composite 109 is provided. First, a release agent 103 is applied to standard tooling equipment 101. Release agents are known in the art of molding. Then, a layer (or sheet) of a ceramic composite material 105 is applied (e.g., manually or mechanically laid) onto the tooling surface 101 over the release agent 103. Then, one or more layers of a second composite material 107 is applied (e.g., manually or mechanically laid) onto the ceramic composite material 105, on the upper/exposed side thereof. Then, the hybrid multifunctional composite 109 is co-cured using a standard autoclave method. The ceramic composite material may be a flexible ceramic composite material as described herein. In some embodiments, the second composite material is a carbon fiber material, for example, a conventional prepreg multilayer carbon fiber material, or a carbon fiber reinforced polymer.

As illustrated in FIG. 2A, a method 200 of making a ceramic composite 209 is provided. First, a carbon nanotube sheet 201 is provided and is infiltrated with one or more ceramic precursors to form a CNT preform 203. Next, precursor drops 205 are applied to a surface of the CNT preform 203. Then, one or more non-woven carbon nanotube tissues 207 are applied (e.g., manually or mechanically laid) to the CNT preform over the precursor drops 205. Next, the CNT preform 203, precursor drops 205, and non-woven carbon nanotube tissues 207 are cured under heat and pressure is applied to form a cured preceramic 207. Finally, the cured preceramic 207 is subjected to pyrolysis to form a ceramic composite 209.

Figure 2B:
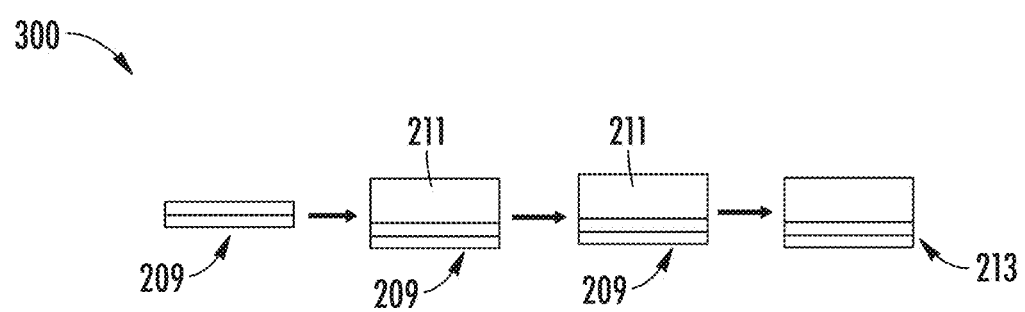
FIG. 2B is a schematic illustration of a method of producing a ceramic-polymer hybrid composite using the CNT composite produced according to the method illustrated in FIG. 2A.

As illustrated in FIG. 2B, a method 300 of making a hybrid composite 213 is provided. First, a ceramic composite 209 is provided. Then, one or more carbon fiber sheets 211 are applied to the ceramic composite 209, sealed in a vacuum, cured, and pressure is applied to produce a hybrid composite 213.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Making One Embodiment of the Ceramic Composite Material

Liquid polysilazane (PSZ), most commonly used as the polymeric precursor of silicon carbonitride (SiCN), was impregnated into an aligned carbon nanotube thin sheet with a high volume fraction. This process was based on the wet infiltration of liquid ceramic polymeric precursors, which is called polymer impregnation and pyrolysis (PIP) process as a versatile method to fabricate carbon fiber reinforced ceramic nanocomposites. Flexibility, mechanical properties and microstructure of our ceramic nanocomposites were characterized and studied. The toughening mechanism of carbon nanotubes in ceramic matrix composites was also studied.

The flexible ceramic composites with a high tensile strength (536.33±7.23 MPa) using carbon nanotube sheet were then aligned by mechanically stretching process. The process was based on the infiltration and pyrolysis of liquid ceramic precursor into aligned carbon nanotube sheet. Mechanical properties and microstructure of the resultant composites were investigated. The resultant nanocomposites maintain well-aligned carbon nanotube morphology with high volume fraction (60%) and long pullout (15 µm), contributing to a high degree of load-transfer efficiency and toughening. Flexibility tests revealed that such ceramic nanocomposites retain the original mechanical properties and microstructures after one thousand repetitions of 75% bending deformation, that showing excellent compliance and durability.

Provided herein is a unique method to prepare flexible ceramic nanocomposites with high strength using aligned carbon nanotube sheet. As carbon nanotubes possess highly anisotropic mechanical properties, different shrinkage rates occur along the length, width and thickness directions during the pyrolysis process. The tensile strength and Young's modulus of these flexible ceramic nanocomposites after polymer impregnation and pyrolysis reached up to 536.33±7.23 MPa and 117.78±3.21 GPa, which is 223% and 1289% of the pristine aligned carbon nanotube sheet. The well-aligned carbon nanotube morphology with high volume fraction (60%) and long pullout (15 µm) contributes to a high degree of load-transfer efficiency and toughening. Further, these ceramic nanocomposites retained the original mechanical properties and microstructures after one thousand repetitions of 75% bending deformation.

Figure 3:
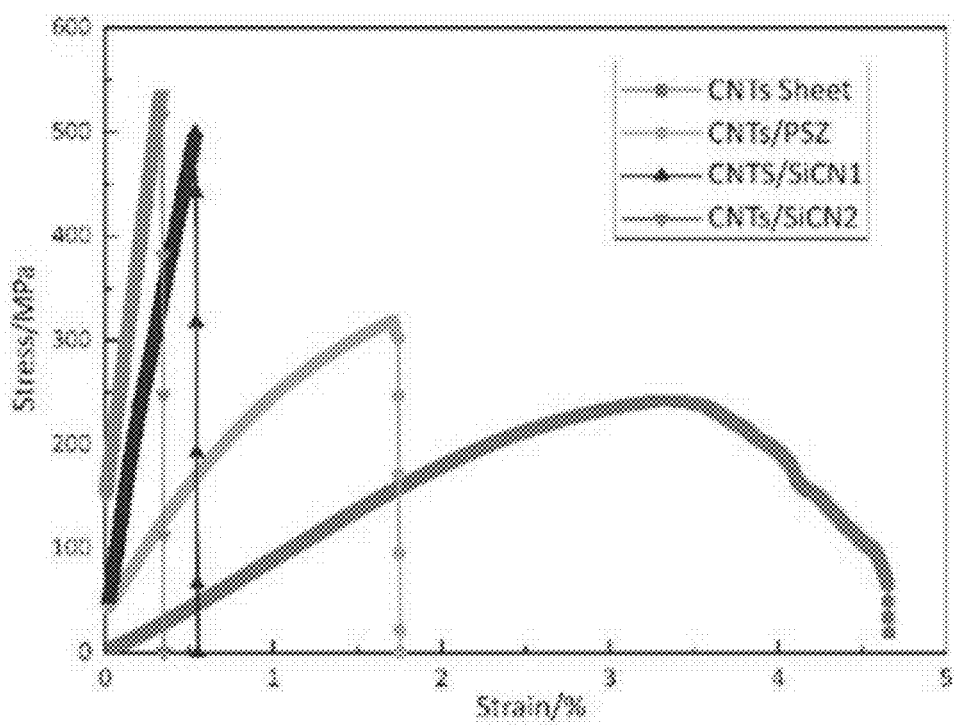
FIG. 3 is a graph depicting the stress/strain curves for a carbon nanotube sheet, (CNT), a CNT impregnated with polysilazane (PSZ), a carbon nanotube/silicon carbonitride nanocomposite (CNTs/SiCN1) after a single pyrolysis cycle, and a carbon nanotube/silicon carbonitride nanocomposite (CNTs/SiCN2) after two pyrolysis cycles.

Carbon nanotubes (CNTs) were used as the reinforcing phase. It has been shown that a high volume fraction of CNTs (up to 60/%) can be reinforced, which led to a tensile strength of the nanocomposites at ~500 MPa and the modulus of 100 GPa, as shown in FIG. 3. Specifically, FIG. 3 illustrates the three-point bending strength of CNT-based ceramic membranes as compared to a CNT sheet. These values represented a 20% increase in the strength and 100% increase in the elastic modulus over other ceramic matrix composites reinforced by carbon fiber.

The properties of the ceramic composite materials of this example were tested and the results are provided at Examples 2-4.

Figure 4:
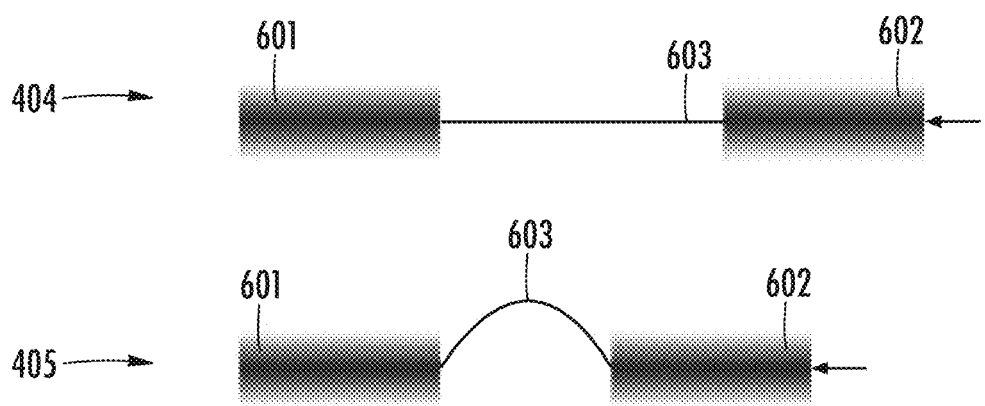
FIG. 4 is a schematic illustration of a testing apparatus used to test the mechanical tensile strength of the ceramic multifunctional composite material according to embodiments of the present disclosure.
Figure 5:
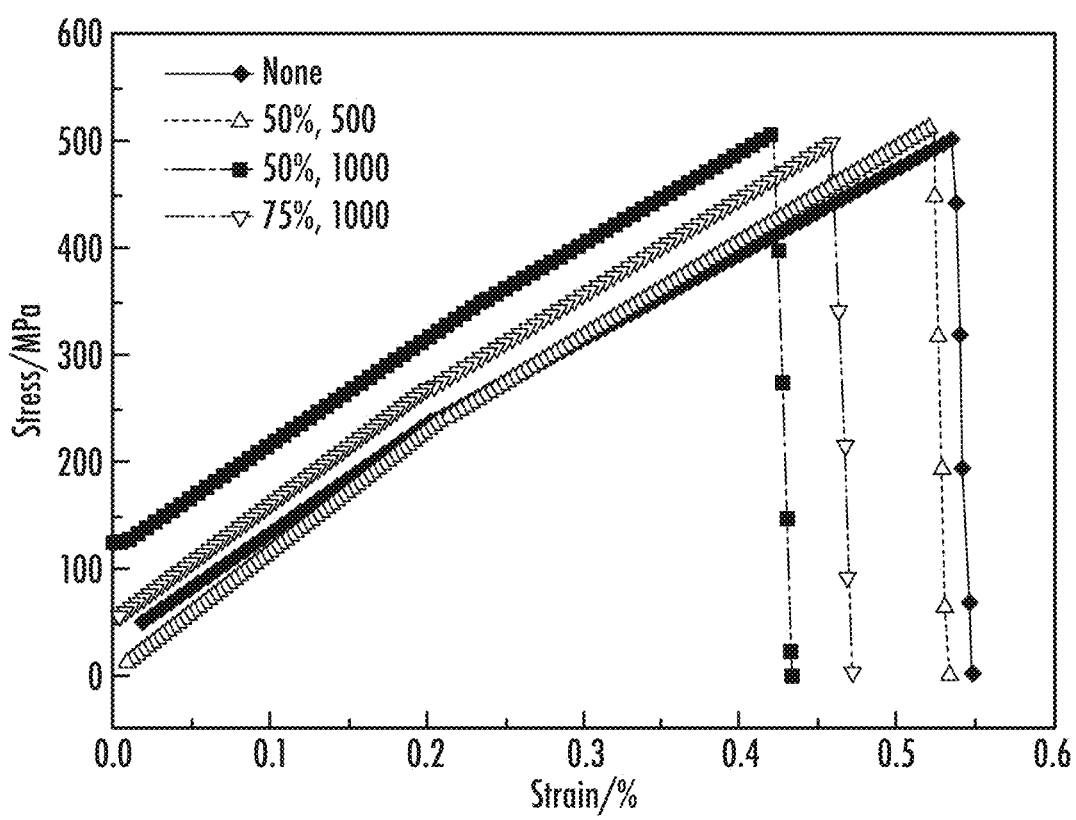
FIG. 5 is a graph depicting the stress/strain curves of an embodiment of a ceramic multifunctional composite material before and after bending with the testing apparatus illustrated in FIG. 4.

Example 2—Testing the Physical Properties of One Embodiment of the Ceramic Composite Material The synthesized CNT-based CMC also demonstrated excellent ductility and flexibility. Membranes of CMC could be bent to 75% of the original length without breakage (repeated for 1000 times). FIG. 4 illustrates the procedure schematic of the flexibility test. Two cylindrical rods 401, 402 were used to hold the sample 403, where rod 402 is movable and rod 401 is stationary and the sample 403 was held in between of these two rods 401, 402. FIG. 4 shows the rods 401, 402 and sample in a first position 404, before bending and in a second position 405, where the sample 403 is being bent by movable rod 402. The flexural strength and modulus of the sample under flexibility test were kept the same level compared to the sample without bending test. FIG. 5 shows the subsequent mechanical properties of the ceramic composites and CNT sheet after the flexibility testing. As can be seen from this figure, even after 500 or 1000 cycles of 50% or 75% bending, the stress-strain curve of the material remained relatively stable.

Figure 6:
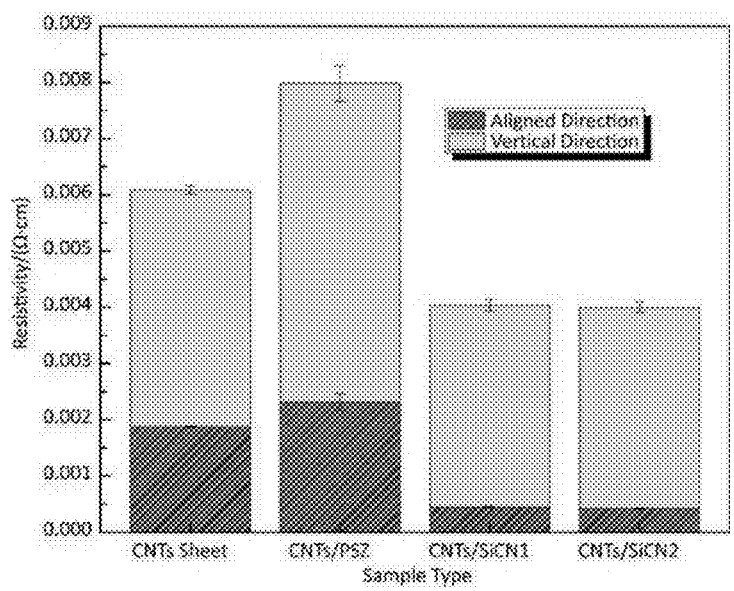
FIG. 6 is a graph depicting the electrical resistivity in the aligned and vertical direction of a carbon nanotube sheet, (CNT), a CNT impregnated with polysilazane (PSZ), a carbon nanotube/silicon carbonitride nanocomposite (CNTs/SiCN1) after a single pyrolysis cycle, and a carbon nanotube/silicon carbonitride nanocomposite (CNTs/SiCN2) after two pyrolysis cycles.

Example 3—Testing the Electrical Properties of One Embodiment of the Ceramic Composite Material Electrical properties were obtained by four probe method testing, and the results, shown in FIG. 6, exhibit anisotropy along the CNT aligned direction and the vertical direction. Surprisingly, as can be seen from FIG. 6, the electrical resistivity of the ceramic membrane was only a quarter of the value of CNTs sheet.

Figure 7:
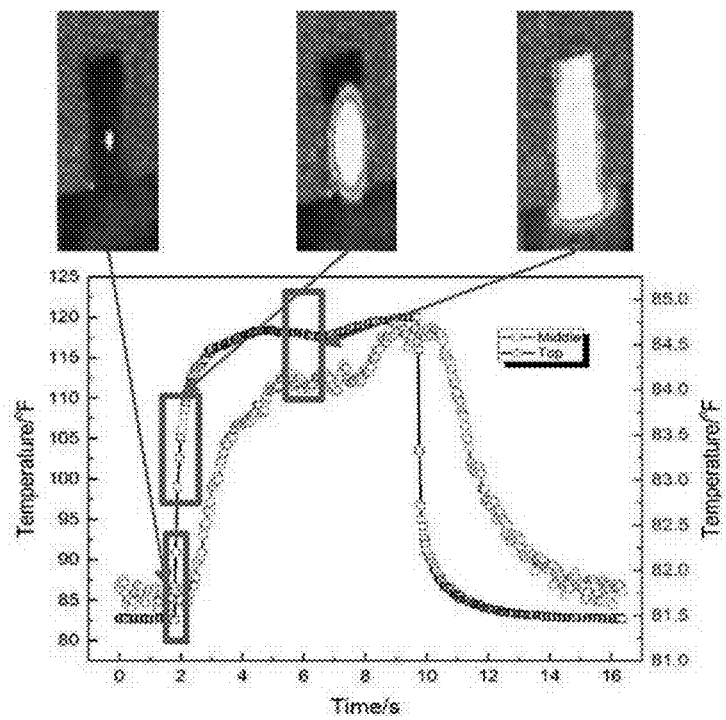
FIG. 7 is a graph illustrating the temperature profiles of a hybrid multifunctional composite material according to an embodiment of the present disclosure.

Example 4—Testing the Thermal Properties of One Embodiment of the Ceramic Composite Material Next, thermal property characterization was performed by shining a laser beam at the center of each sample of the ceramic composite materials, and reading the temperature using an infrared camera. FIG. 7 shows the temperature profiles of the sample under laser irradiation at two different locations: a spot in the middle of the sample, and a spot on the edge of the sample (along the longitude direction). The observed high thermal conductivity of the ceramic membrane beneficially enables heat to be dissipated quickly from the heating source to surrounding areas.

Example 5—Making One Embodiment of the Ceramic Composite Material

Aligned carbon nanotube sheets were prepared by a mechanical-stretching method from random carbon nanotube sheets (Nanocomp Technologies, Inc.), comprising of multi-walled carbon nanotubes (diameter as 6-8 nm and length around 1 mm). The random carbon nanotube sheets were mechanically stretched to a specified strain. The detailed procedure and effect of mechanically stretching random carbon nanotube sheets is described in R. Downes, S. Wang, D. Haldane, A. Moench, and R. Liang, "Strain-Induced Alignment Mechanisms of Carbon Nanotube Networks," *Adv. Eng. Mater.*, 17 [3] 349-58 (2015), the entirety of which is hereby incorporated herein by reference, and in R. D. Downes, A. Hao, J. G. Park, Y.-F. Su, R. Liang, B. D. Jensen, E. J. Siochi, and K. E. Wise, "Geometrically Constrained Self-Assembly and Crystal Packing of Flattened and Aligned Carbon Nanotubes," *Carbon*, 93 953-66 (2015), the entirety of which is hereby incorporated herein by reference. The elongation percentage or strain was monitored and the machine was stopped at a specific amount of strain. In this example, the elongation percentage was controlled to 35%. After mechanical stretching, an aligned carbon nanotube sheet with 8 mm width and 0.041 mm thickness was obtained. The aligned carbon nanotubes sheet was then cut to 38 mm in length. Polysilazane (KiON Defense Technologies, Inc.), a liquid thermosetting resin with repeat units in which silicon and nitrogen atoms are bonded in an alternating sequence, was used as the liquid preceramic precursor of silicon carbonitride in our experiment, and 4 wt. % dicumyl peroxide (Sigma-Aldrich Co.) was used as the thermal initiator. (49).

The integration of aligned carbon nanotube sheet with polysilazane precursor to prepare flexible ceramic nanocomposites occurred in four stages: (a) an aligned carbon nanotube sheet (CNTs sheet) is provided, (b) the aligned carbon nanotube sheet is infiltrated and cured by polysilazane (CNTs/PSZ), (c) carbon nanotube/silicon carbonitride nanocomposites (CNTs/SiCN1) are pyrolyzed from CNTs/PSZ, and (d) carbon nanotube reinforced silicon carbonitride nanocomposites are created with one more polymer impregnation and pyrolysis process (CNTs/SiCN2).

Figure 31A:
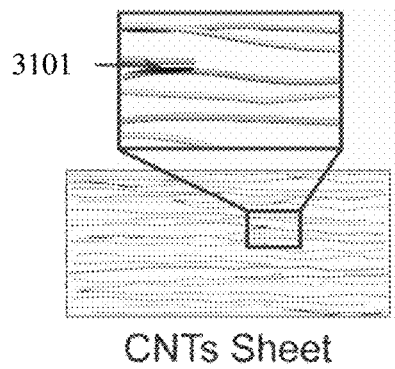
FIGS. 31A-31D are schematic illustrations of a method of producing a hybrid multifunctional composite material according to an embodiment of the present disclosure.
Figure 31B:
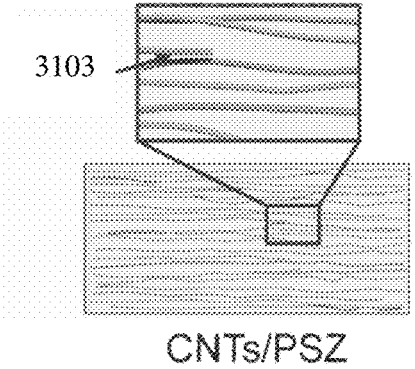
Figure 31C:
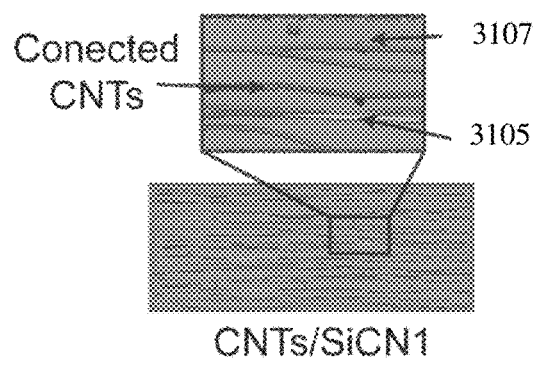
Figure 31D:
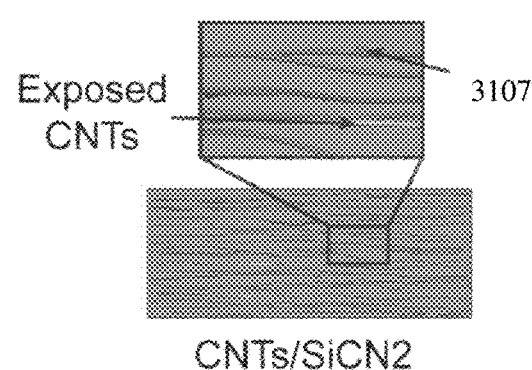

An aligned carbon nanotube sheet with a tightly mesh is illustrated in FIG. 31A. Between this mesh there were small pockets of empty space 3101, which could be infiltrated by the liquid polysilazane precursor. The average pore size in a randomly-oriented CNT sheet is typically about 15.4 nm. In the first step, the liquid precursor was forced into these empty spaces by vacuum, filling the gaps between each interwoven carbon nanotube. And then the sample was cured into a solid preceramic state by thermal crosslinking at 140° C. for 24 hours. After curing, cured PSZ 3103 surrounded the carbon nanotubes, such that solid CNTs/PSZ was obtained where carbon nanotubes were wrapped by the precursor, as shown in FIG. 31B. During the pyrolysis process at elevated temperatures (1000° C.) in nitrogen atmosphere, the cured solid precursor in the carbon nanotube sheets was decomposed into an amorphous silicon carbonitride ceramics, and the flexible ceramic nanocomposites were obtained, noted as CNTs/SiCN1, as shown in FIG. 31C, where some carbon nanotubes 3105 are exposed. Smaller-sized pores 3107 and spaces still existed internally, which were further filled with more iterations of polymer impregnation and pyrolysis process to obtain near fully-densed nanocomposites, noted as CNTs/SiCN2, shown in FIG. 31D.

Flexibility Test

The flexibility test was carried out on a motorized linear stage (Zaber Technologies Inc.). The flexible ceramic nanocomposites were held between of two cylindrical rods, where one was movable and the other was stationary. The bending percentage was monitored by the travel distance of the movable rod and the machine was stopped at 50% and 75% bending percentages, where the movable rod moves 50% and 75% of the sample original length. The bending tests were repeated 500 and 1000 times, and the travel distance and repetition times of the movable rod are controlled by a step motor.

Mechanical Properties and Microstructures Characterization

Tensile strength measurement was conducted by a tensile machine (AGS-J, Shimadzu Scientific, Inc.) with a crosshead speed of 0.5 mm·min$^{-1}$. The strain change was recorded by a non-contact video extensometer DVE-201. To meet the tensile test requirement, the effective size of the sample was controlled to approximately 2 mm in width and 15 mm in gauge length. Five samples were used in mechanical test to ensure the repeatable result. The tensile strength was calculated by taking the average value of the five tests, and Young's modulus was calculated from the slope of each linear fits. P 1000 grade sand paper tabs were used to make the dog-bone shaped sample and meet tensile test standard. The microstructures of the flexible ceramic nanocomposites after tensile strength test were observed using a scanning electron microscope (SEM, JEOL JSM-7401F).

Sample Size Shrinkage

Figure 9A:
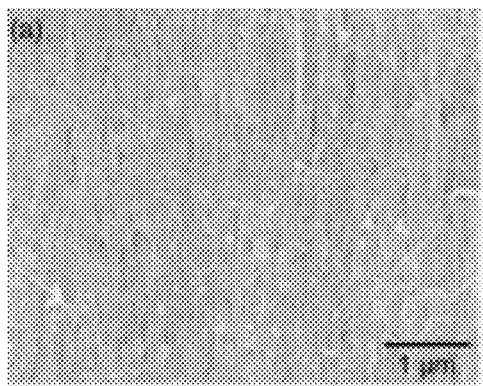
FIG. 9A is a scanning electron microscope (SEM) image of an aligned CNTs sheet.
Figure 9B:
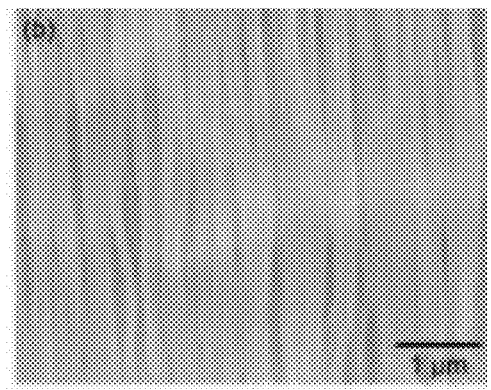
FIG. 9B is an SEM image of the CNTs sheet of FIG. 9A after infiltration with PSZ and curing.

The extremely high aspect ratio (>100,000), high ductility and super elastic nature of carbon nanotubes allows them to be highly aligned by the mechanically stretching method. The resultant aligned carbon nanotube sheet contained a closer packing of carbon nanotubes with fewer voids and less porosity as compared to the voids and porosity of a randomly-aligned carbon nanotube sheet. The original dimensions (length×width×thickness) of aligned CNTs sheet are 38 mm×8 mm×0.041 mm. FIG. 9A shows the SEM image of the resultant aligned CNTs sheet, where some pores exist between the interwoven carbon nanotubes in CNTs sheet. After infiltration and curing, the pores and gaps were filled with the solidified polysilazane where carbon nanotubes wrapped and CNTs/PSZ is obtained, as is shown in FIG. 9B.

Figure 8:
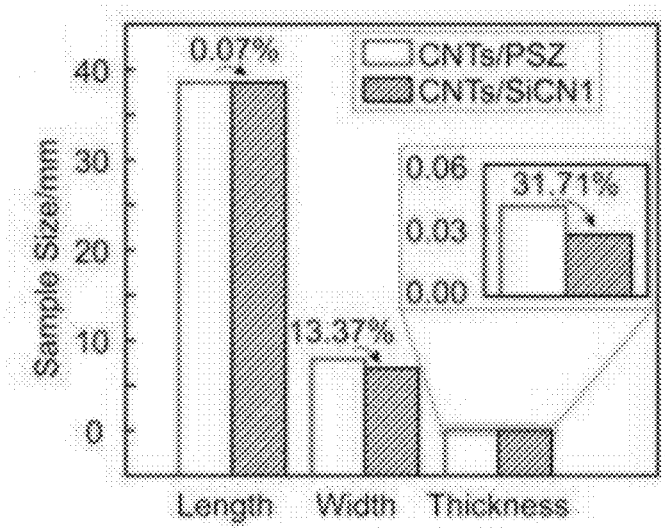
FIG. 8 is a graph depicting the change in length of a CNTs/PSZ sheet and a CNTs/SiCN1 according to an embodiment of the present disclosure.

During the polymer-ceramic conversion from polysilazane to silicon carbonitride, the density increased significantly from 1.1 g·cm$^{-3}$ to 2.23 g·cm$^{-3}$, and around 28% linear shrinkage occurred, which resulted in a large volume reduction. FIG. 8 shows the sample size change and the shrinkage percentage from CNTs/PSZ to CNTs/SiCN1 along length, width and thickness directions. As carbon nanotubes exhibit highly anisotropic mechanical and functional properties, aligned carbon nanotube sheet maintains the same anisotropic property, which leads to the different shrinkage rates along these three directions. The shrinkage rate along the length direction was small as the cylindrical layer-structure of carbon nanotube confines carbon nanotube sheet's structure and restricted the shrinkage.

Figure 9C:
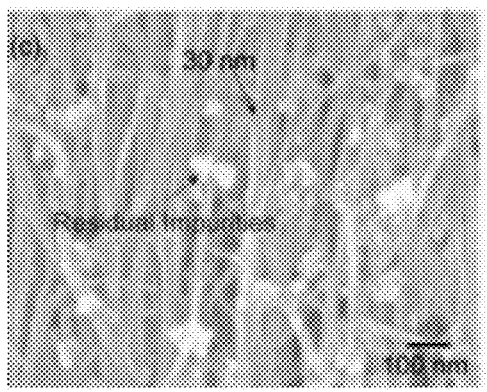
FIG. 9C is an SEM image of the CNTs sheet of FIG. 3A under higher magnification.
Figure 9D:
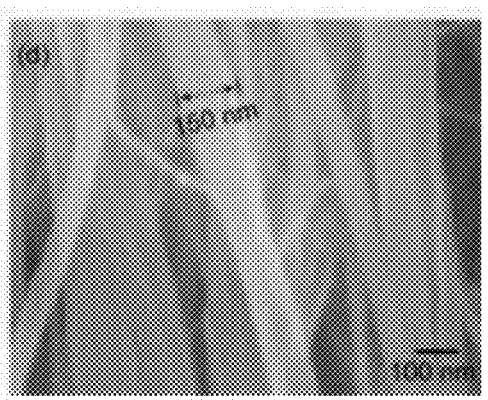
FIG. 9D is an SEM image of the peeled CNTs/SiCN1 of FIG. 9B under higher magnification.

Intuitively, the sample size shrinkage comes from the pyrolysis of precursor inside each gap between pairs of carbon nanotubes. It shows noticeable shrinkage along the width and thickness directions as carbon nanotubes stack onto each other along these two directions, making the cross section (vertical to the carbon nanotube alignment direction) decrease and carbon nanotubes stack closer. FIG. 9B shows the SEM image of the peeled CNTs/SiCN1 which exhibits near perfect carbon nanotube alignment, which helps efficient load-transfer. The shrinkage helps closer contact between each adjacent carbon nanotube pairs. FIGS. 9C and 9D shows the carbon nanotubes assembly in CNTs sheet and CNTs/SiCN1 respectively, showing that some bunches of CNTs with diameter around 150 nm were assembled together during the pyrolysis process. Some pores could also be found in CNTs/SiCN1, as shown in FIG. 9D, making it need additional PIP process steps to densify the ceramic composites.

Mechanical Properties and Microstructure Characterization

Figure 10:
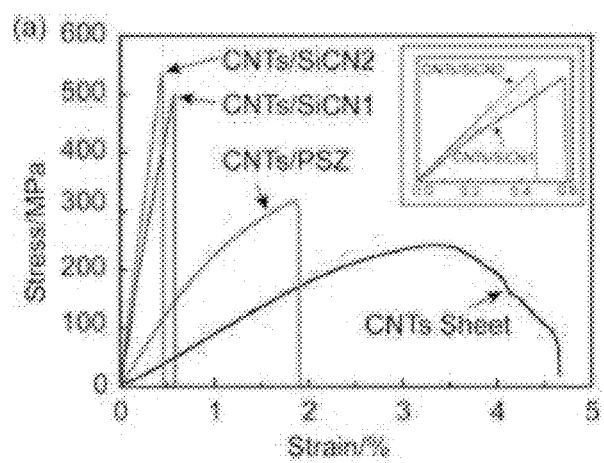
FIG. 10 is a graph depicting the typical tensile stress-strain curves of CNTs sheets, CNTs/PSZ, CNTs/SiCN1, and CNTs/SiCN2 according to an embodiment of the present disclosure.
Figure 11:
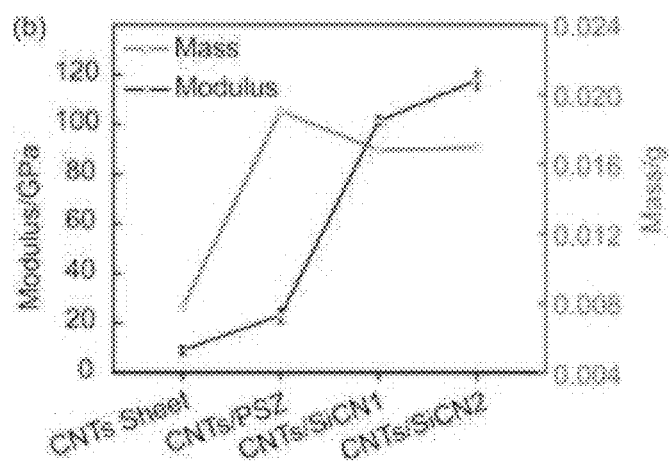
FIG. 11 is a graph depicting the mass and Young's modulus of the materials of FIG. 10.

A tensile strength test was carried out to measure the mechanical properties of the aforementioned materials during the fabrication process. FIG. 10 shows the typical tensile stress-strain curve of the four materials. It exhibited a linear stress-strain relationship in the beginning of all the four curves. The linear portion of the curve is the elastic region and Young's Modulus can be obtained from the slope of the linear fits showing by the dotted line in FIG. 10. The comparison of the Young's modulus and mass increase is illustrated in FIG. 11. From the mass increase and size change of the samples from CNTs sheet to CNTs/SiCN2, the volume fraction of carbon nanotubes in the final nanocomposites was calculated as 60%.

The aligned carbon nanotube sheet exhibited a nonlinear elastic response owing to its high ductility. As the carbon nanotube sheet was aligned by mechanically stretching, it exhibited a high tensile strength of the CNTs sheet along the alignment direction. The tensile strength of the CNTs sheet was 240.78±9.64 MPa. A relatively large failure strain in aligned CNTs sheet comes from carbon nanotube's intrinsic flexibility and high failure elongation, which also resulted in a Young's modulus of 9.14±0.47 GPa along the aligned direction, as shown in FIGS. 10 and 11. After CNTs/PSZ is obtained, it can be considered as one type of thermoset polymer matrix composites. A deviation from the linear response was observed as the load continues in the stress-strain curve because of the toughening of carbo nanotubes for CNTs/PSZ. During the tensile test, the load was transferred from the polymer matrix to carbon nanotube via interfacial bonding. The tensile strength and Young's modulus of CNTs/PSZ reach 318.12±8.47 MPa and 23.16±2.46 GPa, respectively, which was 132% and 253% of the aligned CNTs sheet's tensile strength and Young's modulus, respectively.

After the pyrolysis process, the tensile strength of CNTs/SiCN1 nanocomposites reached up to 501.34±7.55 MPa, which is 208% of the tensile strength of the aligned CNTs sheet, as shown in FIG. 10. The cured polysilazane in the materials system was transformed into silicon carbonitride ceramic during the pyrolysis process. Since ceramics have a high elastic modulus, the pyrolysis process resulted in great enhancement of the Young's modulus over the aligned CNTs sheet, which is 101.24±1.22 GPa. Further polymer impregnation and pyrolysis can further improve the mechanical strength of the nanocomposites through enhanced densification (tensile strength: 536.33±7.23 MPa and Young's modulus: 117.78±3.21 GPa), which is a 223% and 1289% improvement compared to the tensile strength and Young's modulus of the pristine aligned carbon nanotubes sheet. The nonlinear behavior of CNTs/SiCN1 and CNTs/SiCN2 can also be found in their tensile stress-strain curves. To better understand the deviation from the linear response of the tensile stress-strain curves and toughening mechanism of carbon nanotubes in CNTs/SiCN1 and CNTs/SiCN2, they are shown separately in the upper right corner of FIG. 10.

Figure 12A:
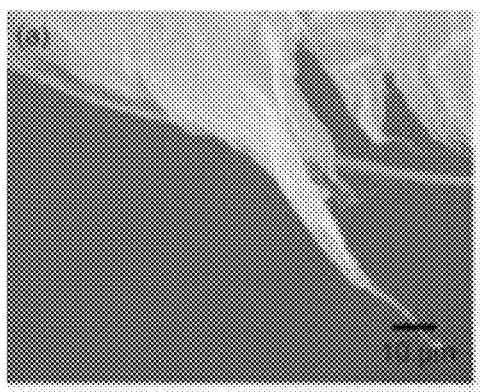
FIG. 12A is an SEM image of the fracture surface of a CNTs sheet after a tensile test.
Figure 12B:
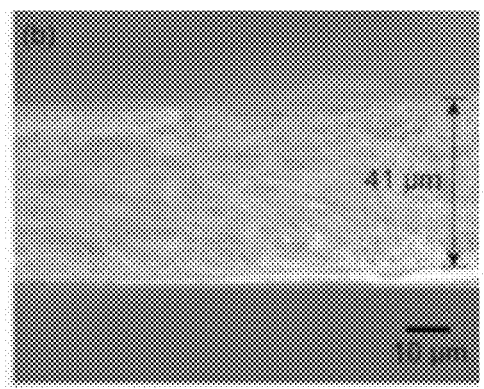
FIG. 12B is an SEM image of the fracture surface of a CNTs/PSZ sheet after a tensile test.
Figure 12C:
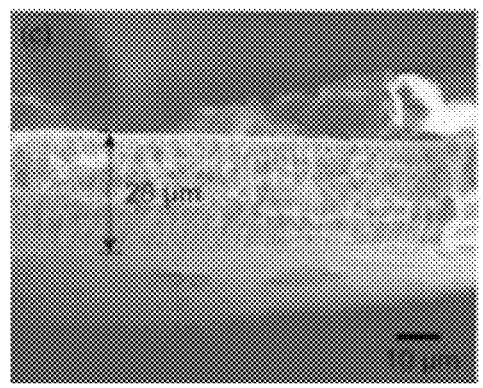
FIG. 12C is an SEM image of the fracture surface of a CNTs/SiCN1 sheet after a tensile test.
Figure 12D:
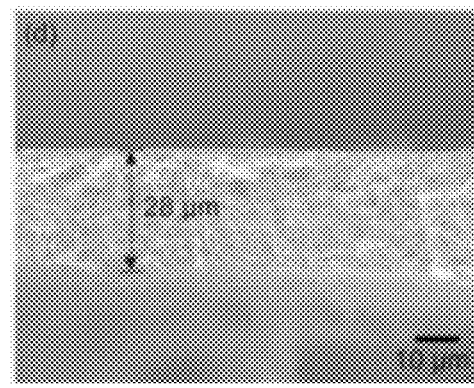
FIG. 12D is an SEM image of the fracture surface of a CNTs/SiCN2 sheet after a tensile test.

FIGS. 12A-12D show the SEM images of the fracture surface of the four samples after tensile testing. FIG. 12A shows that CNTs sheet break with a large width of carbon nanotubes film tapered to several small bundles meaning a non-brittle fracture. As long as the polysilazane is infiltrated and cured in the CNTs sheet and CNTs/PSZ is obtained, they can be combined as carbon nanotubes reinforced thermoset polymer composites. The carbon nanotubes pullout can be found in the fracture surface in FIG. 12B. And the load transfer between carbon nanotubes and the polymer matrix plays a critical role for the failure modes. FIGS. 12C and 12D show a unique fracture surface of carbon nanotubes reinforced ceramic matrix composites, showing long pullout of carbon nanotubes. A comparison of FIGS. 12B-12D show that the thickness of CNTs/PSZ sheet shown in FIG. 12B is much larger than the CNTs/SiCN1 sheet and CNTs/SiCN2 sheet shown in FIGS. 12C and 12D, verifying the size change during the pyrolysis process shown in FIG. 8.

Figure 13:
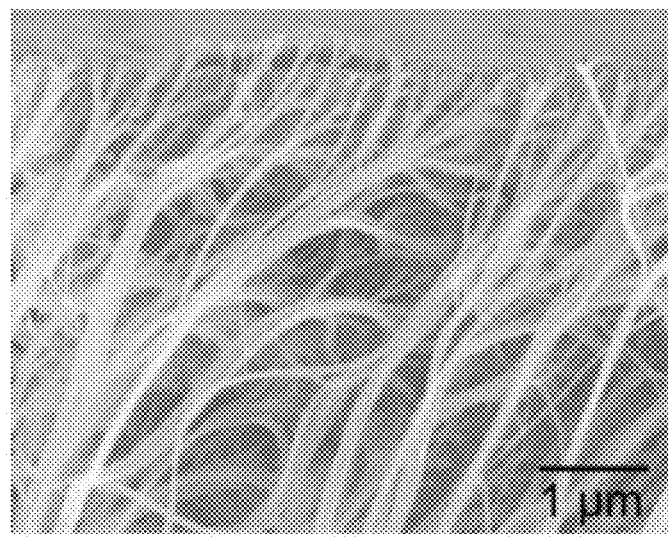
FIG. 13 is an SEM image of the CNTs/SiCN1 sheet shown in FIG. 12C under greater magnification.
Figure 14A:
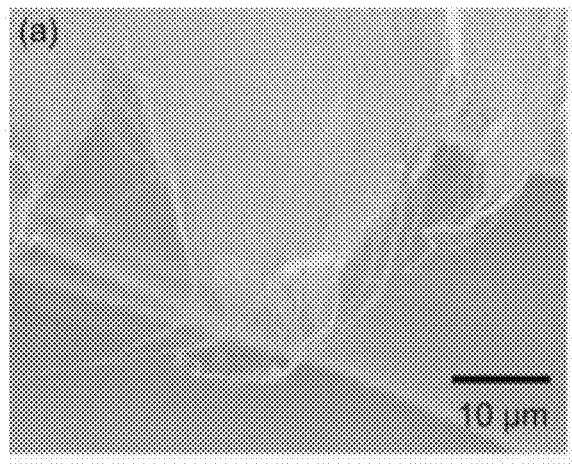
FIG. 14A is an SEM image of the surface of a CNTs sheet after a tensile test.
Figure 14B:
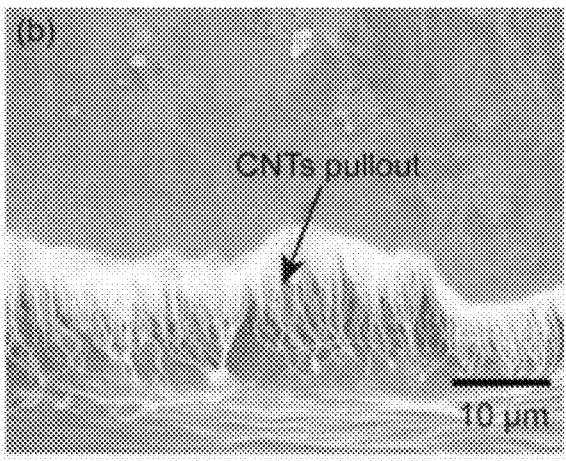
FIG. 14B is an SEM image of the surface of a CNTs/PSZ sheet after a tensile test.
Figure 14C:
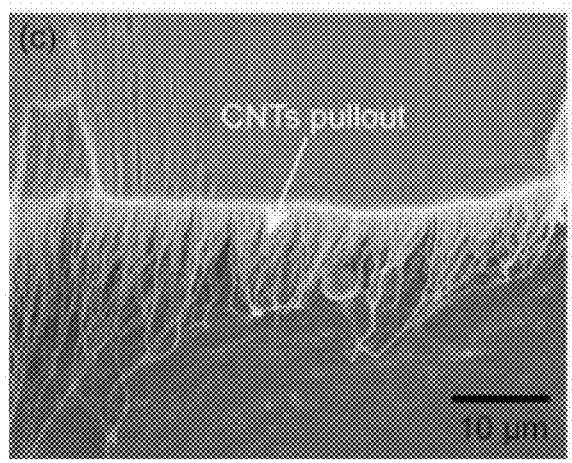
FIG. 14C is an SEM image of the surface of a CNTs/SiCN1 sheet after a tensile test.
Figure 14D:
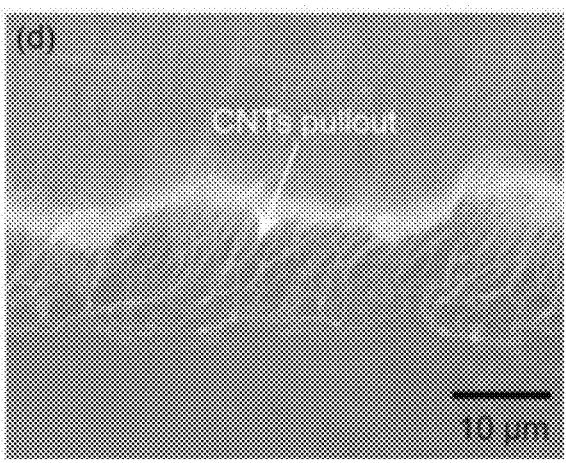
FIG. 14D is an SEM image of the surface of a CNTs/SiCN2 sheet after a tensile test.

FIG. 13 shows the SEM images of the fracture surface of CNTs/SiCN1 of FIG. 12C with greater magnification, verifying the long CNTs pullout. In previous research, the length of carbon nanotubes pullout in CNTs sheets is about 100 nm. FIGS. 14A-14D show the length of carbon nanotubes pullout of the test samples after tensile test. Remarkably, the length of carbon nanotubes pullout is about 15 μm for CNTs/PSZ, CNTs/SiCN1, and CNTs/SiCN2, as shown in FIGS. 14B-14D. Without intending to be bound by any particular theory, it is believed that conventional toughening mechanisms in fiber reinforced ceramic composites, such as fiber pullout, debonding and sliding at the fiber/matrix interface, can be extended to explain these phenomena of our carbon nanotubes reinforced silicon carbonitride composites. In fiber reinforced brittle ceramic matrix composites systems, the energy consumed by the fiber pullout, debonding and sliding against the interface stress between fiber and ceramic matrix mostly contribute to the toughening. It has been proven that the energy dissipated during the fiber-ceramic debonding and fiber pullout can be calculated by Equations (1) and (2), respectively:

$$G_{debond} = \frac{2V_f L G_i}{r} \quad (1)$$

$$G_{pullout} = \frac{V_f L^2 \tau_i}{r} \quad (2)$$

where $V_f$ is the fiber volume fraction, L is the pullout length, $G_i$ is the interface fracture energy, $\tau_i$ is the interfacial shear stress, and r is the fiber radius.

Equations (1) and (2) also provide a general understanding about the toughening factors of carbon nanotubes on ceramics matrix, such as the volume fraction of carbon nanotubes, the interface strength between carbon nanotubes and silicon carbonitride matrix, and the length of carbon nanotubes pullout. In our research, the volume fraction of carbon nanotubes in the resultant ceramic matrix composites is at 60%. The length of carbon nanotubes pullout in FIGS. 12A-12D and FIGS. 14A-14D is about 15 μm.

Using the experimental values determined as discussed above, $V_f$=60%, L=15 μm, and r=8 nm. The interfacial shear stress ($\tau_i$) can be taken from a literature value (10 MPa), and an estimate of $G_i$=4 J/m² for glass matrix materials was used in our calculation. Comparison with carbon fiber reinforced silicon carbide composites (Cf/SiC) and other carbon nanotubes/ceramic composites, the $G_{debond}$ and $G_{pullout}$ of our composites are large, as shown in Table 1 below.

TABLE 1

| Sample | $V_f$ (%) | L (μm) | R (nm) | $G_{debond}$ (J/m²) | $G_{pullout}$ (J/m²) |
|---|---|---|---|---|---|
| Cf/SiC[30] | 40 | 100 | 7 × 10³ | 45.1 | 5.71 × 10³ |
| CNTs/SiO₂[39] | 10 | 0.1 | 10 | 8 | 1 |
| Test sample | 60 | 15 | 8 | 9 × 10³ | 1.68 × 10⁵ |

Significantly longer pullout length and high volume fraction of carbon nanotubes lead to substantial increases in $G_{pullout}$ and $G_{debond}$, in the test sample as compared to prior art composites, suggesting that the test sample has a higher toughening effect.

Flexibility Test

The ceramic nanocomposites of this example were flexible and could be easily bent by fingers with fingertip pressure so that the two ends of the sample touch each other. After the bending deformation, the flexible ceramic nanocomposites are able to fully reflect back to the original shape.

Our flexible ceramic nanocomposites show two features in this example: thin structure and excellent toughening effect of carbon nanotubes. The thin structure makes the flexural rigidity very small, which is defined as the force couple required to bend a structure, as shown in Equation (3):

$$D = \frac{Eh^3}{12(1-\nu^2)} \quad (3)$$

where D is flexural rigidity, E is the Young's modulus, ν is the Poisson's ratio and h is the thickness. The flexural rigidity is determined by the Young's modulus, Poisson's ratio and the thickness. Taken from the experimental results of our flexible ceramic nanocomposites, the Young's modulus is about 110 GPa, and the thickness is about 28 μm. The Poisson's ratio is taken as 0.35, so the flexural rigidity of our flexible ceramic nanocomposites is about 2.3×10⁻⁴ Pa·m³, meaning that our samples are easy to be bent.

We investigated the effect of bending deformation on mechanical properties and microstructures of our flexible ceramic nanocomposites. The test method is schematically illustrated in FIG. 4. The sample used in the flexibility test is CNTs/SiCN1. The sample was held between two cylindrical rods, where one was movable and the other was stationary. During the flexibility test, two factors can be controlled: the bending percentage (a) and the number of bending times. The bending percentage is described in Equation (4):

$$\alpha = \frac{l_0 - l_1}{l_0} \times 100\% \quad (4)$$

where $l_0$ is the original length of our flexible ceramic nanocomposites, and $l_1$ is the smallest distance between the two rods during flexibility test, which is monitored by the travel distance of the movable rod. The machine was stopped at a specific amount of bending percentage. The travel distance and repetition times of the movable rod were controlled by a step motor. The detailed test condition and resultant mechanical properties is listed in Table 2. Taking the last condition (75%, 1000 times) as an example, the length of our flexible ceramic nanocomposites was 38 mm and it was pressed until the distance between the two rods is 9.5 mm. The movable rod was bent back and forth for 1000 times under this condition.

Figure 15:
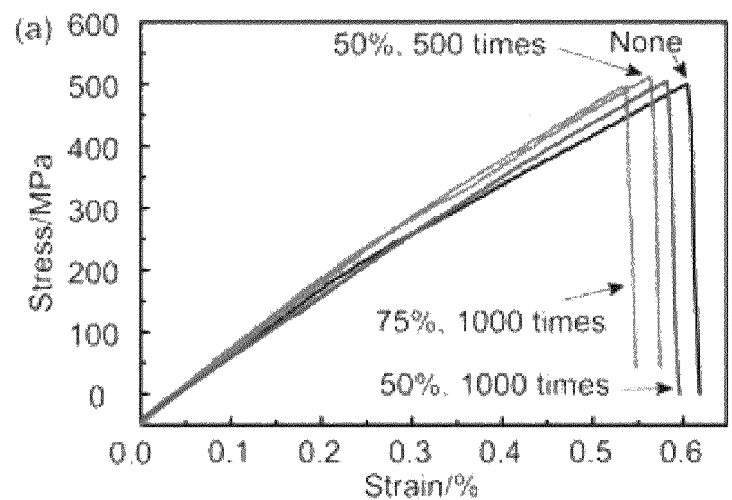
FIG. 15 is a graph depicting the stress/strain curves of another embodiment of a ceramic multifunctional composite material before and after bending with the testing apparatus illustrated in FIG. 4.
Figure 16:
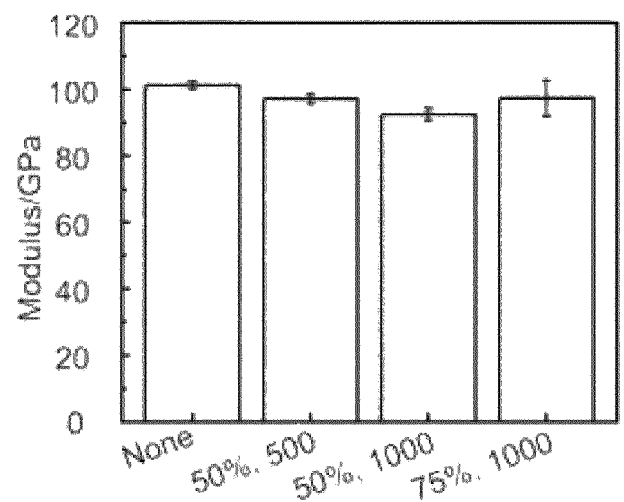
FIG. 16 is a graph depicting the Young's modulus of the materials of FIG. 15.

Aligned carbon nanotube sheets have been used to prepare carbon nanotube reinforced polymer matrix nanocomposites, which demonstrate good flexibility and mechanical/electrical properties. FIGS. 15 and 16 show the mechanical properties of our flexible ceramic nanocomposites during the aforementioned flexibility test. The results of the flexibility test are also shown in Table 2 below.

TABLE 2

| Item | Bending Percentage (α) | Times | Tensile Strength (MPa) | Young's Modulus (GPa) |
|---|---|---|---|---|
| 1 | 0 | 0 | 501.34 ± 7.53 | 101.24 ± 1.22 |
| 2 | 50% | 500 | 511.51 ± 4.06 | 97.11 ± 1.56 |
| 3 | 50% | 1000 | 504.01 ± 5.23 | 92.54 ± 1.85 |
| 4 | 75% | 1000 | 495.51 ± 6.91 | 97.32 ± 5.43 |

The sample without flexibility test (Item #1 in Table 2) is shown as 'None' in FIGS. 15 and 16. As we discussed above, all the samples exhibit a linear stress-strain relationship in the beginning of the curves. The Young's Modulus was obtained from the slope of the linear portion of the curve. Because of the toughening of carbon nanotubes in our ceramic composites, evident deviation from the linear response was found in the stress-strain curves as the load continued.

Figure 17A:
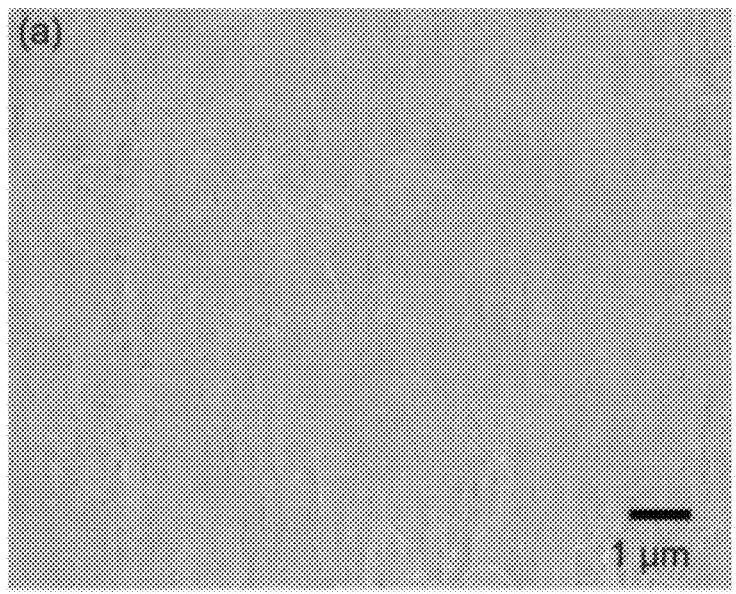
FIG. 17A is an SEM image of an embodiment of a flexible ceramic nanocomposite after a flexibility test of 1000 repetitions of 75% bending.
Figure 17B:
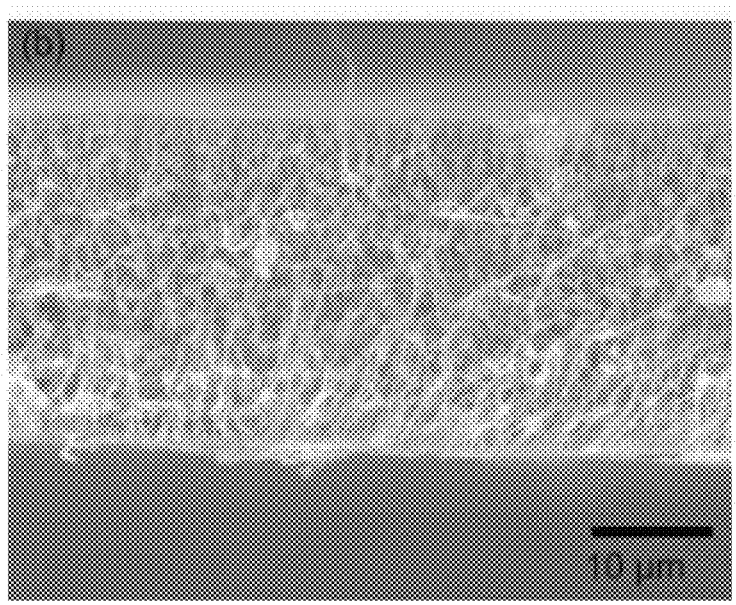
FIG. 17B is an SEM image of the fracture cross-sectional surface of the flexible ceramic nanocomposite shown in FIG. 17A.

The tensile strength and modulus of our flexible ceramic nanocomposites after flexibility test were maintained at a constant level as the sample without flexibility test, as shown in FIGS. 15 and 16. FIGS. 17A and 17B shows SEM images of the surface and fracture cross-sectional surface, respectively of the flexible ceramic nanocomposites after flexibility test (75%, 1000 times). FIG. 17A shows that no apparent crack appeared on the surface of the flexible ceramic nanocomposites after the flexibility test even after 1000 repetitions of 75% bending Similar fracture surface and carbon nanotube pullout phenomenon are shown in FIG. 17B. The flexibility test results demonstrated that the ceramic nanocomposites created in this example retain the original mechanical properties and microstructures of the CNT, meaning excellent compliance and durability.

Figure 18A:
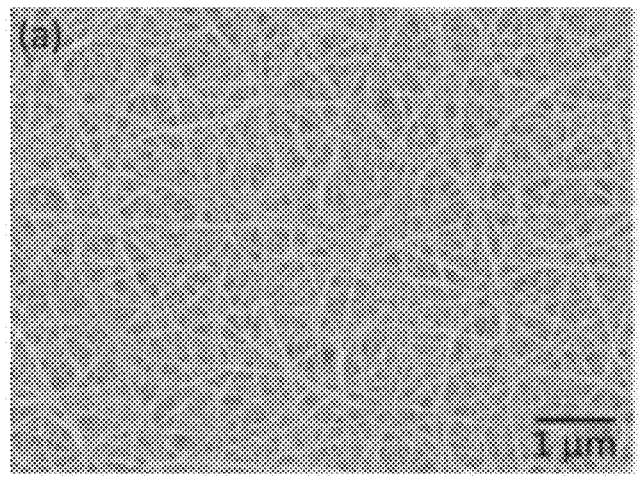
FIG. 18A is an SEM image of a random carbon nanotube sheet.
Figure 18B:
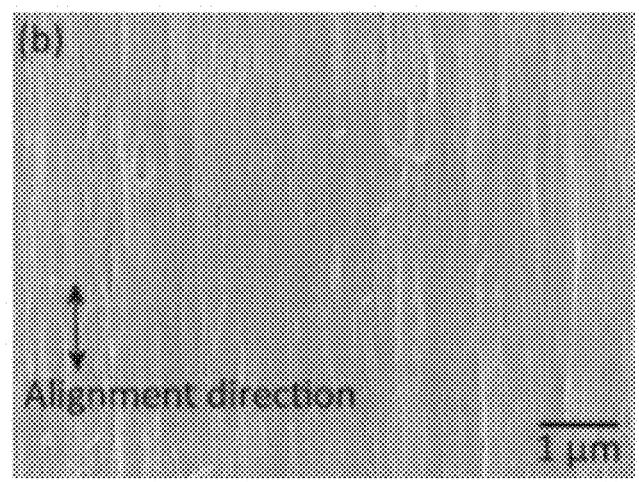
FIG. 18B is an SEM image of an aligned carbon nanotube sheet according to an embodiment of the present disclosure.

Example 6—Characterization of High Electrical Conductivity and Anisotropy of Nanocomposites For this example, aligned carbon nanotube sheets were obtained from mechanically stretched random carbon nanotube sheets (Nanocomp Technologies, Inc.). An SEM image of the random carbon nanotube sheet is shown in FIG. 18A, and an SEM image of the aligned carbon nanotube sheet is shown in FIG. 18B. The diameter and length of multi-walled carbon nanotubes in the random carbon nanotube sheets were 6-8 nm and 1 mm, respectively. The extremely high aspect ratio (>100,000) of carbon nanotubes ensured high ductility and super elastic of the carbon nanotube networks, which allowed it to be highly aligned by mechanical stretching process. The random carbon nanotube sheets were mechanically stretched by a specified strain. The elongation percentage or strain was monitored and the machine was stopped at a specific amount of strain. In this example, the elongation percentage was controlled as 35%.

Aligned carbon nanotubes reinforced silicon carbonitride composites were prepared by infiltrating and pyrolyzing liquid polysilazane (PSZ) into the aligned carbon nanotube sheet. Polysilazane (KiON Defense Technologies, Inc.), a low viscosity liquid thermosetting resin with repeat units in which silicon and nitrogen atoms are bonded in an alternating sequence, was used as the liquid preceramic precursor of silicon carbonitride (SiCN). This process was based on the wet infiltration of liquid ceramic polymeric precursors, which is commonly referred to as a polymer impregnation and pyrolysis (PIP) process.

In the first step, the liquid precursor was forced into these empty spaces by vacuum, and filled the gaps between each interwoven carbon nanotube. And then the sample was cured into a solid preceramic state by thermal crosslinking at 140° C. for 24 hours. Afterwards, solid CNTs/PSZ was obtained where carbon nanotubes were wrapped by the precursor. During the pyrolysis process at elevated temperatures (1000° C.) for 1 hour in a nitrogen atmosphere, the cured solid precursor in the carbon nanotube sheets was decomposed into an amorphous silicon carbonitride ceramic, and the ceramic nanocomposites were obtained. Smaller sized pores and spaces still existed internally which were further filled with further cycles of the polymer impregnation and pyrolysis (PIP) process to obtain near fully-densed nanocomposites. That is, the PIP process was repeated to obtain nanocomposites which contained very few pores or voids. According to the above description, four stages existed in the process of this example: (a) aligned CNTs sheet, (b) carbon nanotube sheet infiltrated by polysilazane (CNTs/PSZ), (c) carbon nanotube/silicon carbonitride nanocomposites (CNTs/SiCN1), and (d) carbon nanotube/silicon carbonitride nanocomposites with one more PIP process (CNTs/SiCN2).

During the polymer-ceramic conversion from polysilazane to silicon carbonitride, the density increased significantly from 1.10 g·cm$^{-3}$ to 2.23 g·cm$^{-3}$, and around 28% linear shrinkage occurred, which resulted in a great volume reduction. As carbon nanotubes exhibit highly anisotropic mechanical and functional properties, the ceramic composite maintained the same anisotropic property, which led to different shrinkage rates along three directions, as shown in Table 3 below.

TABLE 3

| | Length/ mm | Width/ mm | Thickness/ mm | Cross-sectional Area/mm$^2$ |
|---|---|---|---|---|
| CNTs/PSZ | 38.58 | 7.93 | 0.041 | 0.33 |
| CNTs/SiCN1 | 38.55 | 6.87 | 0.028 | 0.19 |
| Shrinkage Percentage | 0.08% | 13.37% | 31.71% | 42.42% |

The shrinkage rate along the length direction was small. While not intending to be bound by any particular theory, it is believed that the cylindrical layer-structure of the carbon nanotubes confined the structure of the carbon nanotube sheet and thereby restricted shrinkage. Not wishing to be bound by any particular theory, it was believed that shrinkage resulted from the pyrolysis of precursor inside each gap between pairs of carbon nanotubes. Shrinkage was noticable along the width and thickness directions as carbon nanotubes stacked onto each other along the two directions, making the cross section perpendicular to the carbon nanotube alignment direction smaller and carbon nanotubes stack closer.

After the infiltration and curing process, the original dimensions (length×width×thickness) of CNTs/PSZ were 38.58 mm×7.93 mm×0.041 mm. The dimensions of CNTs/SiCN1 became 38.55 mm×6.87 mm×0.028 mm under the pyrolysis process, meaning the cross-sectional area along the alignment direction decreased by 42.42%. The shrinkage did not affect the alignment degree of carbon nanotubes, on the contrary, closer contact between each carbon nanotube was obtained as a result of the shrinkage.

Figure 19:
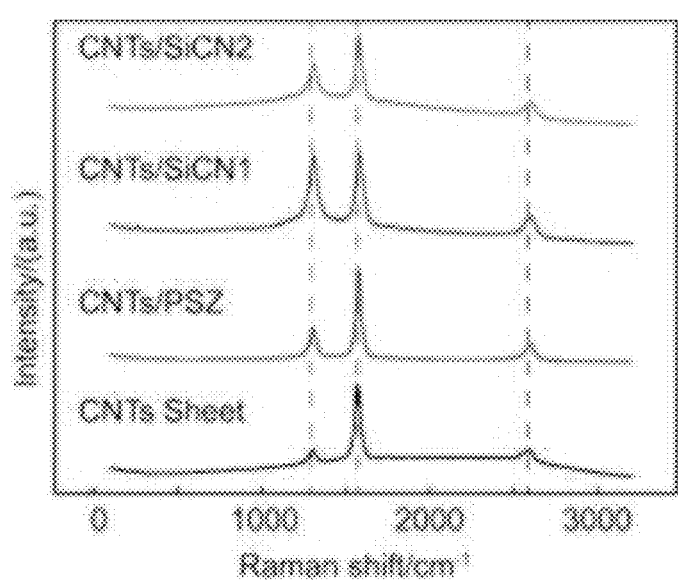
FIG. 19 is a graph depicting the Raman analysis of a CNTs sheet, CNTs/PSZ, CNTs/SiCN1, and CNTs/SiCN2 made according to an embodiment of the present disclosure.

Raman spectroscopic characterization was carried out on a Renishaw in Via micro-Raman system using a 785 nm excitation wavelength (1.58 eV) diode laser. Typical laser power was 0.5 mW with a 50× magnification objective lens, and the laser beam size was around 1 mm in diameter. The peaks at 1340 cm$^{-1}$ (D band) and 1589 cm$^{-1}$ (G band) were the main features of sp2 crystalline graphitic structures. The peak at 2660 cm$^{-1}$ (G' band) revealed the few layer nature of carbon nanotubes in as-received state and in the ceramic composites. The relative lower G' band in the ceramic composites suggested the possible overlapping of carbon nanotubes. Compared with aligned carbon nanotubes, the intensity of the D band became much higher in CNTs/SiCN1 and CNTs/SiCN2 composites. The Raman spectroscopic characterizations of these materials are shown in FIG. 19.

While not intending to be bound by any particular theory, the defective nature of CNTs in the ceramic composites may be ascribed to the changes in Raman analysis. The reaction between carbon nanotubes and polysilazane during the pyrolysis process at high temperatures may introduce certain defects.

The electrical conductivity was measured using the four-probe method (Jandel universal probe system with Keithley 2002 MEM multimeters). It was tested five times for each sample and the electrical conductivity was obtained by calculating the average value. Influence of the pyrolysis process on the anisotropy of the electrical properties was investigated. In this example, high volume fraction, high aspect ratio (>100,000) and good alignment of carbon nanotubes made the ceramic nanocomposites demonstrate ultra-high electrical conductivity. The electrical conductivity along ($\sigma_\parallel$) and vertical ($\sigma_\perp$) to the length direction is summarized at FIGS. 20A-20D. As the electron charge ran along the length of the carbon nanotube much more readily than it jumped through the carbon nanotube, the carbon nanotube alignment led to the anisotropy of $\sigma_\parallel$ and $\sigma_\perp$ for all these samples. In this example, the values of $\sigma_\parallel$ were much higher than that of $\sigma_\perp$, which was also demonstrated by the value of $\sigma_\parallel/\sigma_\perp$ in FIG. 20C.

For the CNTs sheet, the values of $\sigma_\parallel$ and $\sigma_\perp$ were $5.3\times10^4$ and $1.6\times10^4$ S·m$^{-1}$ separately, meaning $\sigma_\parallel/\sigma_\perp$ was equal to 3.3. The high electrical conductivity was attributed to the percolation network of carbon nanotube. The high concentration and alignment realized a high degree of carbon nanotubes contact. There were two sources of electrical resistance in the CNTs sheet: the intrinsic resistance along carbon nanotube and the contact resistance at the carbon nanotube junction point. It has been demonstrated that the contact resistance strongly depended on the contact length at the carbon nanotube junction, carbon nanotube diameter, and atomic structures in the contact region. The high concentration and alignment promised a high degree of contact between rigid neighboring carbon nanotubes.

Figure 20A:
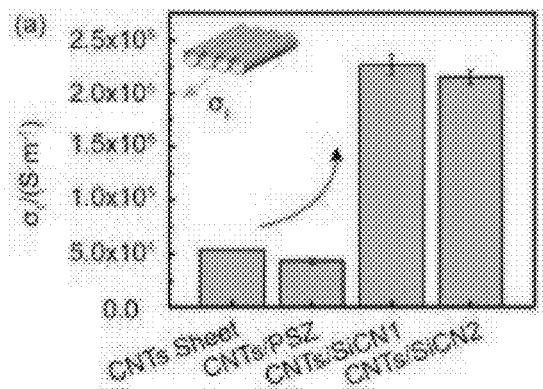
FIG. 20A is a graph depicting the electrical conductivity of the materials of FIG. 19 along the CNT alignment direction.
Figure 20B:
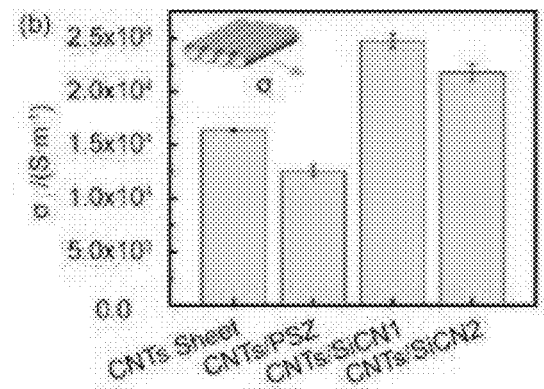
FIG. 20B is a graph depicting the electrical conductivity of the materials of FIG. 19 along a direction vertical to the CNT alignment direction.
Figure 20C:
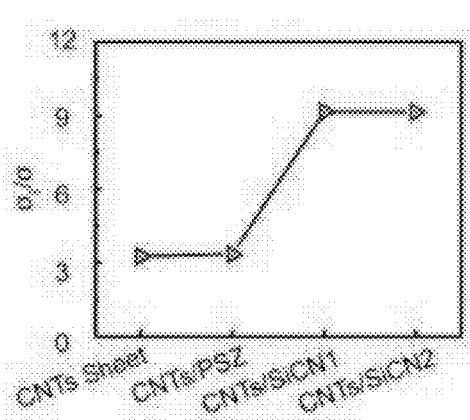
FIG. 20C is a graph depicting the ratio of the electrical conductivities of FIG. 20A to the electrical conductivities of FIG. 20B.
Figure 20D:
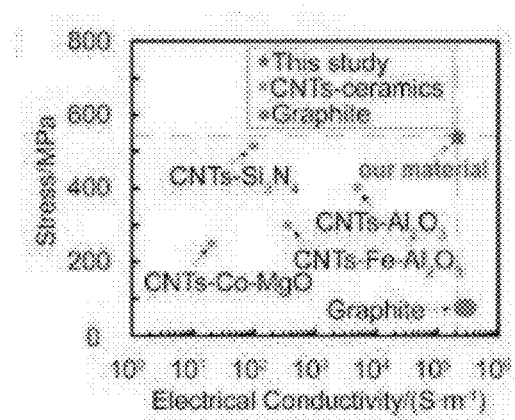
FIG. 20D is a graph depicting a comparison of the stress and electrical conductivity of the CNTs/SiCN2 of FIGS. 20A-20C to other ceramics and graphite.
Figure 21A:
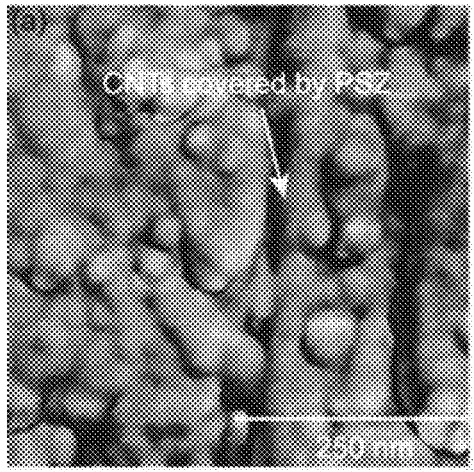
FIG. 21A is an atomic force microscopy (AFM) image of CNTs/PSZ according to an embodiment of the present disclosure.
Figure 21B:
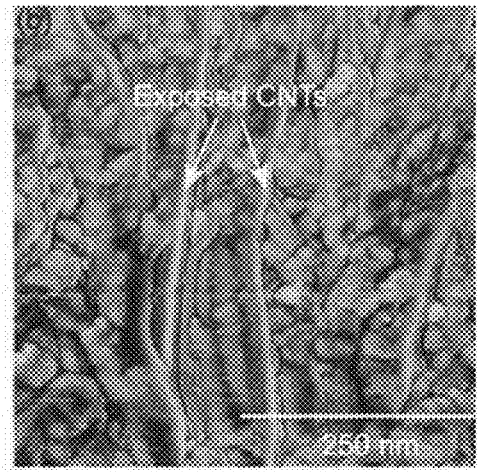
FIG. 21B is an atomic force microscopy (AFM) image of CNTs/SiCN1 according to an embodiment of the present disclosure.
Figure 21C:
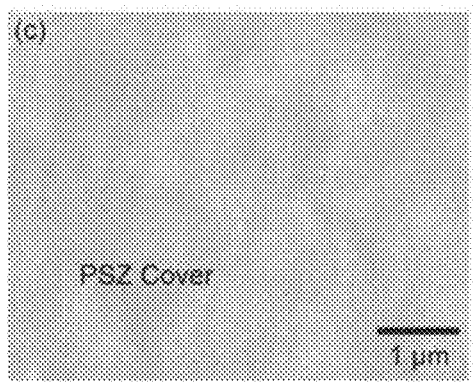
FIG. 21C is an SEM image of CNTs/PSZ according to an embodiment of the present disclosure.
Figure 21D:
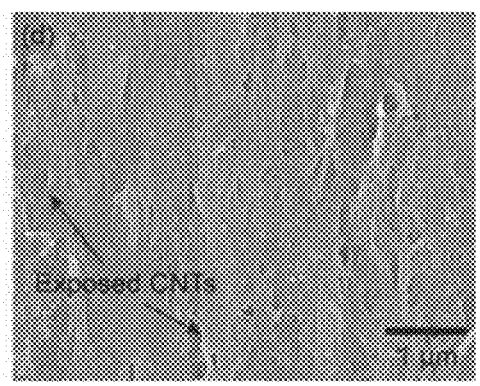
FIG. 21D is an SEM image of CNTs/SiCN1 according to an embodiment of the present disclosure.

After the polymeric precursor was infiltrated into carbon nanotube sheet to make CNTs/PSZ, the pores in the aligned carbon nanotube sheet were filled with polymeric precursor. The surface of the ceramic composites of this example was observed using a scanning electron microscope (SEM, JEOL JSM-7401F) and atomic force microscopy (AFM, Veeco Instruments Inc.). FIGS. 21A and 21B show AFM images of CNTs/PSZ and CNTs/SiCN1, respectively. FIGS. 21C and 21D show SEM images of CNTs/PSZ and CNTs/SiCN1, respectively. As can be seen from these figures, a thin polymer layer was coated on the surface of carbon nanotube sheet. Since the polymer was insulating, both $\sigma_\parallel$ and $\sigma_\perp$ reduced slightly when compared to the value of CNTs sheet, as shown in FIGS. 20A and 20B. The pyrolysis process from CNTs/PSZ to CNTs/SiCN1 led to a dramatic change of the electrical conductivity. The value of $\sigma_\parallel$ for CNTs/SiCN1 reached up to $2.3\times10^5$ S·m$^{-1}$ as shown in FIG. 20A. FIG. 20D shows the comparison of aligned carbon nanotube ceramic nanocomposites with other representative carbon nanotube-ceramic nanocomposites and graphite. It was found that the electrical conductivity of the ceramic nanocomposites of this example were at the same level as that of graphite in the basal plane. Unprecedentedly high electrical conductivity was achieved, therefore, in the ceramic nanocomposites of this example.

As discussed previously, the precursor was transferred from polymer state to ceramic state with a great shrinkage during the pyrolysis process. Not wishing to be bound by any particular theory, this shrinkage was believed to improve the electrical conductivity of the ceramic nanocomposites for two reasons. Firstly, the shrinkage changed the sample size, especially along the width and thickness directions, and it is believed that this resulted in more close contact between carbon nanotubes. The more closely carbon nanotubes stack together, the more effectively electron transport can occur.

Secondly, as shown at FIGS. 21A-21D, the thin polymer layer on the surface of the carbon nanotube sheet hampered the electron charge for CNTs/PSZ and the shrinkage exposed carbon nanotubes on the surface for CNTs/SiCN1. Some carbon nanotubes were exposed outside. The pyrolysis process played an important role on the mechanical and electrical properties of resultant ceramic nanocomposites.

These explanations were verified by the microstructure characterization of the nanocomposites' surface from CNTs/PSZ to CNTs/SiCN1 at FIGS. 21A-21D. The value of $\sigma_\perp$ almost doubled from CNTs/PSZ to CNTs/SiCN1 in FIG. 20B because of the closer packing of carbon nanotubes. However, $\sigma_\parallel$ was significantly higher than $\sigma_\perp$ and $\sigma_\parallel/\sigma_\perp$ increased to 9.2 after the pyrolysis process, demonstrating more significant anisotropy for CNTs/SiCN1 (FIG. III(c)). After one more polymer infiltration and pyrolysis process, CNTs/SiCN2's electrical conductivity became $2.2\times10^5$ S·m$^{-1}$, and the $\sigma_\parallel/\sigma_\perp$ was still 9.2.

In this example, a unique method to prepare ceramic nanocomposites with high electrical conductivity using aligned carbon nanotube sheet is explained. As carbon nanotubes have highly anisotropic properties, different shrinkage rates occurred along the length, width and thickness directions during the pyrolysis process. The well-aligned carbon nanotube morphology contributed to significant electron transport. The electrical conductivity of the ceramic composites along the alignment direction was $2.2\times10^5$ S·m$^{-1}$, which was at the same level as the electrical conductivity of graphite in the basal plane. The anisotropy of electrical conductivity increased from 3.3 to 9.2 after the pyrolysis process. The high electrical conductive feature of the unique ceramic composites made it applicable for electromagnetic interference shielding.

Example 7—Testing the Thermal Stability and Conductivity of One Embodiment of a Flexible Ceramic Composite Material As discussed in detail above, ceramic composite materials can sustain much higher temperatures than traditional CFRP composites. First, a flexible ceramic composite material was prepared using the methods described above. Additionally, samples of commercially-available samples of SiCN, $Si_3N_4$, SiBCN, CFRP and C/C composites were gathered and tested. The flexible ceramic composite material used was a polymer-derived ceramic (PDC), which exhibits excellent high temperature stability, as discussed in detail above. It resists thermal decomposition and exhibits excellent anti-oxidation behavior, as discussed above. As shown in FIG. 22, comparing with commercial SiCN and $Si_3N_4$, the mass loss of Boron-doped SiCN is at minimum level under temperature higher than 1400° C.

Also, as shown in Table 4 below, the in-plane conductivity of the flexible ceramic composite material, in this case a carbon nanotube-reinforced flexible ceramic composite is much higher than that of traditional CFRP composites. Specifically, at room temperature, the in-plane thermal conductivity is about 87 W/mK, which is much higher than that of the typical CFRP composite, or other C/C, SiC/SiC composites. Advantageously, with such exceptional thermal stability and thermal conductivity, the heat in a local hot spot can be quickly dissipated to another area along the in-plane direction of the surface, without burning damage onto the inside composite material.

TABLE 4

| Material | Strength (MPa) | Density (g·cm$^{-3}$) | In-plane Thermal Conductivity (W/(m·K)) | Through-thickness thermal conductivity (W/(m·K)) |
|---|---|---|---|---|
| C/C composite [12] | ~200 | 1.55 | ~22 | — |
| SiC/SiC composite | ~200 [13] | 2.5 | ~19 [14] | — |
| CFRP composite | 300~600 [15] | 1.3~1.6 [15] | 6.7 [16] | 0.5 [12] |
| flexible CNT-reinforced ceramic composite | 536 | 2.1 | 87 | 2 |

Thus, in embodiments of the present disclosure, ceramic composites comprising a flexible ceramic composite material, SiCN, SiAlCN, SiC, or $Si_3N_4$ may be combined with a second composite material, such as a polymer composite or a CFRP composite in a standard co-curing layup process to result in a hybrid multifunctional composite material. As is evidenced by FIGS. 23A and 23B and Table 5, the resulting hybrid multifunctional composite material, because it will include a ceramic composite layer, would exhibit greater thermal stability and conductivity than a comparable polymer composite or CFRP composite without a ceramic composite layer.

TABLE 5

| Properties | Polymer derived SiAlCN | SiC | $Si_3N_4$ |
|---|---|---|---|
| Strength (MPa) | ~1000 | ~400 | ~700 |
| Thermal shock FOM* | 1800-3600 | 350 | 880 |
| Oxidation rate (×10$^{-18}$ m$^2$/s, @ 1400° C.) | 0.47 | 16.4# | 6.2# |
| Corrosion rate (×10$^{-6}$ g/cm$^2$ hr, @ 1400° C., $H_2O$) | 0.98 | 6.4# | 6.2# |
| Hardness (GPa) | 15-20 | 30 | 28 |
| Density (g/cm$^3$) | 2.2 | 3.17 | 3.19 |
| Fracture toughness (MPa·m$^{1/2}$) | 3.5 | 4-6 | 5-8 |
| Young's modulus (GPa) | 92 | | 320 |
| Poisson's ratio | 0.18 | 0.14 | 0.24 |
| CTE (coefficient of thermal expansion, 10$^{-6}$/K) | 3 | 3.8 | 2.5 |

*Thermal shock FOM = strength/(E · CTE)
The lowest values reported for SiC and $Si_3N_4$ tested at the same conditions.

Example 8—Testing the Chemical Stability of Ceramic Composite Materials

As described above, a major disadvantage of CFRP composites is the influence of environmental factors, such as humidity, corrosive fluids, and ultraviolet (UV) light on the performance of CFRP composites. For example, moisture at high working temperature may lead to degradation, particularly at the matrix-fiber interface, as the moisture will plasticize the polymer matrix. Such environmental conditions may cripple mechanical and physical properties. For example, moisture absorption will reduce the glass transition temperature of the resin and produce volumetric swelling in resin.

Unlike CFRP composites, ceramic composite materials exhibit higher chemical stability than CFRP composites. In particular, polymer derived ceramics (PDCs), which are a class of materials synthesized by thermal decomposition of polymeric precursors instead of by conventionally sintering ceramic powder compacts, may exhibit particularly high chemical stability. For example, polysilazane, which is the precursor of silicon carbon nitride (SiCN) ceramics, produces ceramics which show enhanced chemical stability, and possesses a set of excellent high temperature thermo-mechanical properties. Specifically, silicon carbon nitride ceramics are thermally stable and resistant to large-scale crystallization at temperatures up to 2000° C.; and their creep resistance exceeds that of state-of-the-art polycrystalline silicon carbide (SiC) and silicon nitride ($Si_3N_4$).

Polymer derived Aluminum-doped SiCN (SiAlCN), SiC, and $Si_3N_4$ ceramics were prepared by annealing at 1400° C. for 300 hrs in 50% $H_2O$-50% $O_2$. The strength, thermal shock, oxidation rate, corrosion rate, hardness, density, fracture toughness, Young's modulus, Poisson's ratio, and coefficient of thermal expansion was calculated for each ceramic sample. As shown in Table 5, SiAlCN ceramics exhibit an anomalously high resistance to oxidation and hot-corrosion. This anomalously high resistance to oxidation and corrosion can be explained by reference to FIGS. 23A and 23B, which show that SiAlCN ceramics (such as that shown in FIG. 23B) have a much smoother surface than typical silicon-based ceramics, such as the SiC shown in FIG. 23A and $Si_3N_4$ ceramics.

Thus, in embodiments of the present disclosure, ceramic composites comprising SiCN, SiAlCN, SiC, or $Si_3N_4$ may be combined with a second composite material, such as a polymer composite or a CFRP composite in a standard co-curing layup process to result in a hybrid multifunctional composite material. As is evidenced by FIGS. 23A and 23B and Table 5, the resulting hybrid multifunctional composite material, because it will include a ceramic composite layer, would exhibit greater chemical stability than a comparable polymer composite or CFRP composite without a ceramic composite layer.

Example 9—Testing Electrical Conductivity and Emi Shielding of One Embodiment of a Flexible Ceramic Composite Material First, a flexible ceramic composite material was prepared using the methods described above. The stress (MPa) and electrical conductivity (S·m$^{-1}$) was measured for this sample, stress and electrical conductivity values were gathered from the literature for CNTs-$Si_3N_4$, CNTs-Co—MgO, CNTs-$Al_2O_3$, and CNTs-Fe—$Al_2O_3$, and the reported values are shown in FIG. 26.

Figure 26:
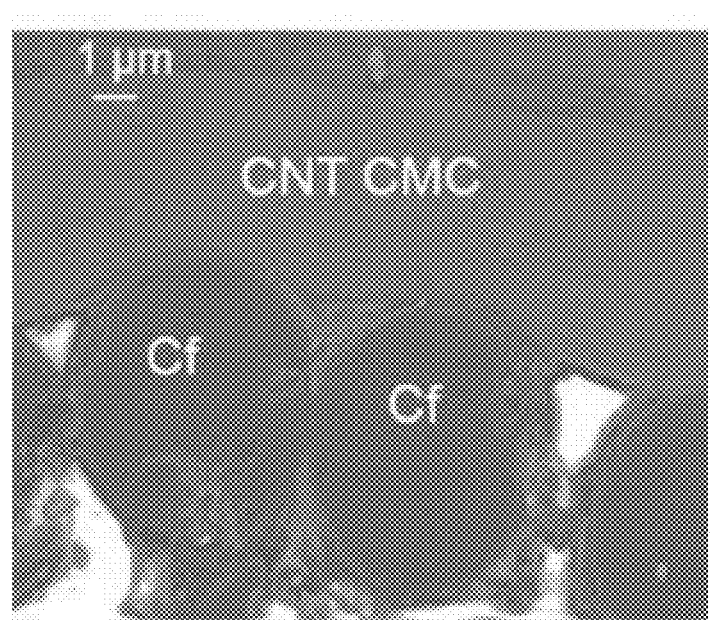
FIG. 26 is an SEM image of a cross-section of the hybrid composite of FIG. 25B.

As shown in FIG. 26, the flexible ceramic composite material prepared according to a method described above has a high electrical conductivity (3.22×10$^6$ S·m$^{-1}$). FIG. 20D illustrates that such sample has the best combined mechanical and electrical properties, compared with other CNT-reinforced ceramic composites and graphite. Specifically, the high electrical conductivity is beneficial to provide electromagnetic interference (EMI) shielding, which blocks the adverse effects of electromagnetic radiation by using conductive or magnetic shielding materials.

Table 6 below lists parameter comparison between copper and the flexible ceramic composite material, showing that the flexible ceramic composite material sample is lighter, and has high electrical conductivity and survivability in higher temperature than copper. As would be understood by one of skill in the art, whenever an electromagnetic wave hits a conductor, the wave will attenuate as it penetrates the conductor with a characteristic distance. Thus, the higher the electrical conductivity, such as that exhibited by the proposed hybrid composite material, the better EMI shielding performance it provides.

TABLE 6

|  | Density (g · cm$^{-3}$) | Electrical Conductivity (S · m$^{-1}$) | Surviving Temperature in Air (° C.) |
| --- | --- | --- | --- |
| Copper | 8.96 | 5.96 × 10$^7$ | 200 |
| Flexible Ceramic Composite | 2.1 | 3.22 × 10$^6$ | 1000 |

Example 10—Simulation Examples on Hybrid Multifunctional Composites

To help understand the heat dissipation properties of the material, finite element modeling (FEM) was used to simulate temperature change under a hot spot (temperature as 200° C., 400° C. and 600° C., diameter as 0.4 mm) on a hybrid multifunctional composite material. The thermal conductivity values used in this simulation are listed in Table 4 above. Typically, the most common matrix materials for CFRP composites are epoxy and bismaleimides (BMI). Epoxy has a wide range of applications, including metal coatings, fiber-reinforced plastic materials and structural adhesives. The glass transition temperature of epoxy is about 75° C. BMI is another common polymer processed by the condensation reaction of a diamine with maleic anhydride. The glass transition temperature of BMI is about 260° C.

Table 7 below lists four simulation cases of the proposed hybrid multifunctional composites. As shown in FIG. 1, the outmost layer of the hybrid multifunctional composite is the flexible ceramic film, and the inner layers are typical CFRP composites. During simulation, the thickness of the flexible ceramic composite was set as 25 um and 50 um. With the help of the flexible ceramic composite's anisotropic thermal conductivity, (dissipating heat in higher rate to other area along the in-plane direction), the highest temperature at the CFRP composite (Tf) is well below the glass transition temperature (Tg) for both BMI and Epoxy matrices, even though the surrounding temperature on the outmost shell are set as high as 200° C., 400° C. and 600° C., respectively. Notably, the surviving temperature on the outside shell is a function of the thickness of the flexible ceramic composite, thus the surviving temperature can be adjusted and optimized by adjusting the thickness of the flexible ceramic composite, based on the actual needs.

TABLE 7

| Flexible ceramic membrane thickness | Polymer matrix | Tg/° C. | Tf/° C. | Surviving temperature on the outside shell (° C.) |
| --- | --- | --- | --- | --- |
| 25 um | BMI | 260 | 152 | 400 |
| 50 um | BMI | 260 | 117 | 600 |

TABLE 7-continued

| Flexible ceramic membrane thickness | Polymer matrix | Tg/° C. | Tf/° C. | Surviving temperature on the outside shell (° C.) |
| --- | --- | --- | --- | --- |
| 25 um | Epoxy | 75 | 25 | 200 |
| 50 um | Epoxy | 75 | 25 | 400 |

Figure 24A:
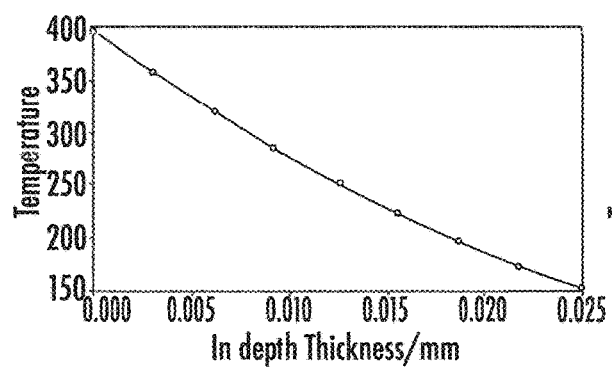
FIG. 24A is a graph of a simulation of the heat transfer through the thickness of a hybrid multifunctional composite according to an embodiment of the present disclosure.
Figure 24B:
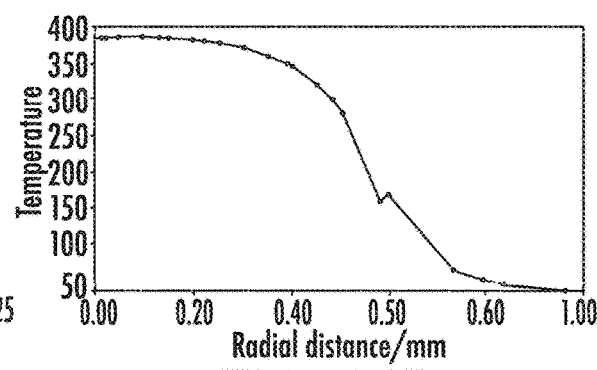
FIG. 24B is a graph of a simulation of the heat transfer on the surface of a hybrid multifunctional composite according to an embodiment of the present disclosure along a radial direction moving away from the heat source.

FIGS. 24A and 24B are graphical illustrations of the first simulation case, where the thickness of the flexible ceramic membrane is 25 μm, and the polymer matrix is BMI. These figures demonstrate that the heat can dissipate quickly along the surface, instead of penetrating deeper into the BMI matrix. FIG. 24A illustrates the temperature decrease monotonically to the bonding interface between the flexible ceramic film and the CFRP composites. Local temperature at the interface is only 152° C., which is much lower than the glass transition temperature (Tg: 260° C.) of BMI. FIG. 24B is the temperature distribution on the outside surface.

Example 11—Making a Second Embodiment of the Ceramic-Polymer Hybrid Composite

Random carbon nanotube (CNT) sheets (Nanocomp Technologies, Inc.), containing multi-walled carbon nanotubes (diameter as 6-8 nm and length around 1 mm), were used as preforms for CNT nanocomposites. Polysilazane (KiON Defense Technologies, Inc.), was used as the liquid preceramic precursor of Silicon Carbonitride (SiCN) to prepare the CNTs reinforced ceramic matrix nanocomposites. Non-woven carbon fiber tissues (ACP Composites, Inc.) with an area density of 0.5 oz/yd$^2$ and a thickness of 60 microns were used as a transition layer material. 375 (carbon fiber)/5250-4 (Bismaleimide, BMI) equivalent prepreg (Stratton Composite Solutions) with ply thickness around 3 mm was used to prepare the carbon fiber reinforced polymer composites (CFRP).

First, the preform was immersed into polysilazane (liquid state, ceramic precursor) and then subjected to a vacuum. The preform was then taken out of the polysilazane bath, residual liquid was wiped off, and a controlled drops/volume of the same precursor were applied on one surface. Three layers of non-woven carbon fiber tissues were then laid up over the drops as a transition layer, which was designed to enhance the bonding strength. Then, the preform, precursor, and carbon fiber tissues were cured into a solid preceramic composite by thermal crosslinking at 140° C. for 24 hours under pressure. The solid preceramic composite was transformed into a CNT reinforced ceramic matrix nanocomposite by pyrolytic transformation of the pre-ceramic polymer at 1000° C. for 1 hour in nitrogen atmosphere. A schematic illustration of this process is shown in FIGS. 2A and 2B.

Next, one layer of carbon fiber reinforced BMI prepreg was laid up on the transition layer side of the CNT ceramic nanocomposites to form a laminate structure. The laminate structure was sealed in a vacuum bag and co-cured under a two-step process. The first step involved the application of 30 psi pressure under 250° F. for 30 minutes on the structure. Then, 100 psi was supplied at 350° F. for 6 hours at the second step. A schematic illustration of the process for preparing the ceramic-polymer hybrid composites is shown in FIG. 2B.

Figure 25A:
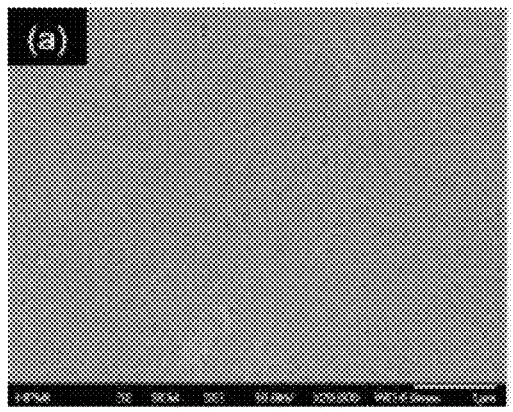
FIG. 25A is an SEM image of a CNT preform (surface).
Figure 25B:
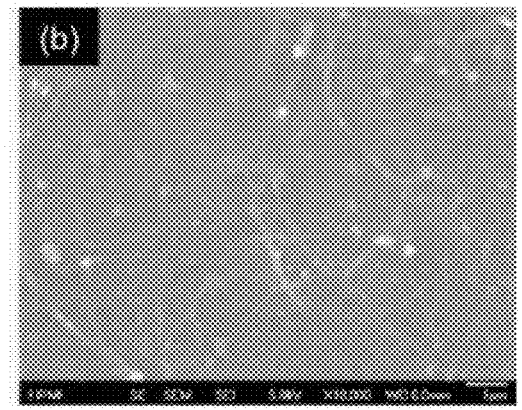
FIG. 25B is an SEM image of a hybrid composite (surface) made using the CNT preform of FIG. 25A.

An SEM image of the CNT preform is shown in FIG. 25A. As can be seen from this figure, the CNT preform contains a network with nano-scale pores. An SEM image of the hybrid composite is shown in FIG. 25B. As can be seen from FIG. 25B, after infusing the ceramic precursor and converting to the hybrid composites, the surface maintains a flat and smooth condition that is suitable for many different applications.

FIG. 26 is an SEM image of a cross-section of the hybrid composite. As can be seen from this figure, the carbon fibers, which have a diameter of 10 μm, seamlessly bond with the nano-scale CNT ceramic layer. This bonding ensures the integrity and mechanical strength of the hybrid composites.

Figures 27A, 27B:
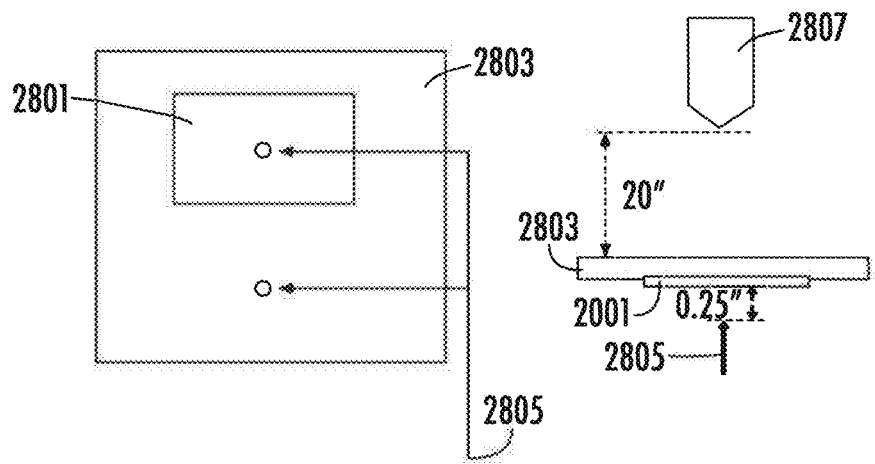
FIG. 27A is a schematic drawing of a top view of an experimental setup used to test hybrid composites according to embodiments of the present disclosure.
FIG. 27B is a schematic drawing of a side view of the experimental setup of FIG. 27A.

Example 12—Testing the Thermal Properties of a Second Embodiment of the Ceramic-Polymer Hybrid Composite To measure the thermal insulation effects of the protection CNT ceramic nanocomposite, a 2.5" by 3" CNT ceramic nanocomposites layer was applied on a 6" by 6" CFRP substrate. A soldering tip aligned with the center of the CNT ceramic nanocomposites layer and the center of the uncoated portion of the CFRP substrate and set to a distance of 0.25" away from the sample surface. An infrared camera was positioned twenty inches (20") away from the sample to detect the temperature on the back of the sample. A schematic drawing of a top view of the CNT ceramic nanocomposites layer 2801, the CFRP substrate 2803, and the point heat source 2805 is shown in FIG. 27A. A schematic drawing of a side view of the experimental setup is shown in FIG. 27B, which includes the CNT ceramic nanocomposites layer 2801, the CFRP substrate 2803, the point heat source 2805, and the IR camera 2807.

Figure 28:
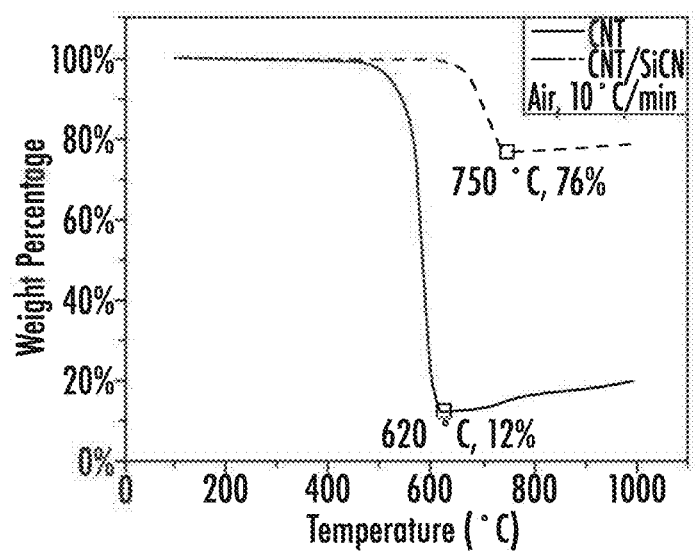
FIG. 28 is a graph depicting the TGA results of a CNT preform and a CNT/SiCN ceramic composite according to an embodiment of the present disclosure.

First, the thermal stability of CNT/SiCN ceramic composite itself was measured. TGA results of the CNT/SiCN ceramic composite are shown in FIG. 28. As can be seen from this figure, CNT/SiCN composites have good thermal stability in air up to 1000° C., while CNT preforms can only survive below 500° C.

Figure 29:
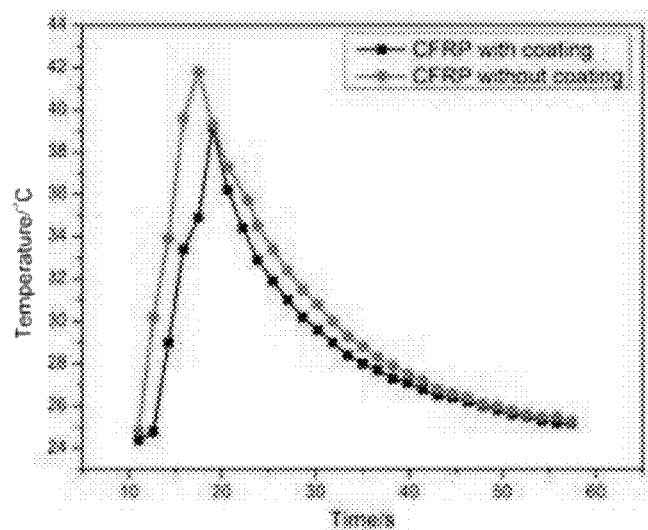
FIG. 29 is a graph depicting the maximum temperature detected by an IR camera in testing a CFRP with a coating and without a coating.
Figure 30A:
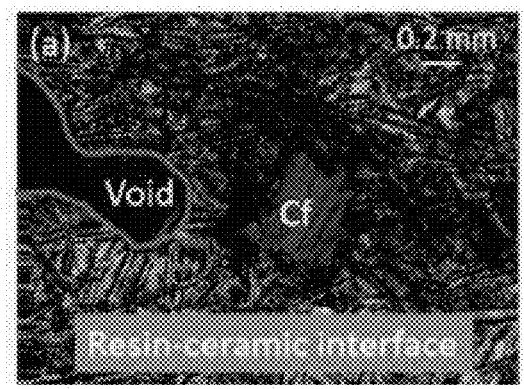
FIGS. 30A-30D are confocal images of the surface morphology of hybrid composites according to embodiments of the present disclosure after a pull-off treatment.
Figure 30B:
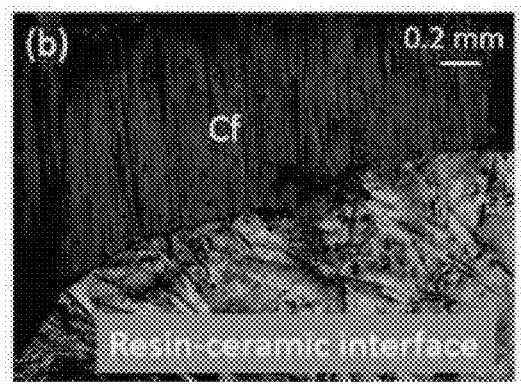
Figure 30C:
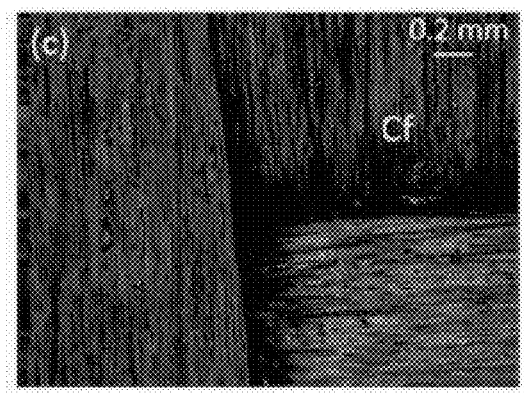
Figure 30D:
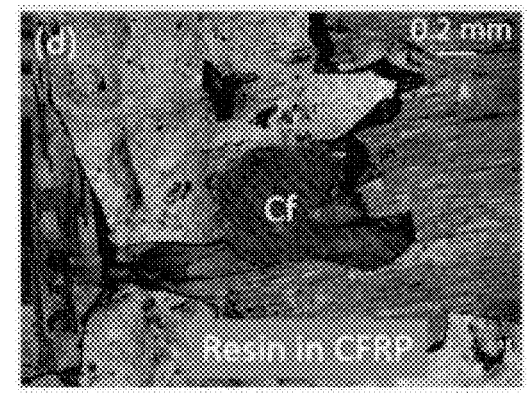

Next, real-time measurements were taken using the experimental setup shown in FIGS. 27A and 27B. The maximum temperature detected by the IR camera was recorded and is shown in FIG. 29. As can be seen from comparing the maximum temperature recorded on the CFRP with a coating and the CFRP without a coating, the ceramic layer offered thermal protection in the form of both delayed and thermal insulation. The temperature difference is around 2° C. because the real temperature on the samples surface is much lower than 260° C. due to the 0.25" distance between the sample surface and the heat source.

Example 13—Testing the Bonding Strength and Fracture Mechanism of the Second Embodiment of the Ceramic-Polymer Hybrid Composite Four different hybrid composites were created, using different transition layers between the CFRP and coating layers, and the pull-off bonding strength, or the force required to separate the coating and the CFRP, were measured, as detailed in Table 8 below:

TABLE 8

| Sample No. | Transition Layer | Bonding Strength (MPa) |
| --- | --- | --- |
| 1 | Non-woven carbon fiber tissue with 2 drops of Polysilazane | 3.5 |
| 2 | Non-woven carbon fiber tissue with 5 drops of Polysilazane | 8.3 |
| 3 | Non-woven carbon fiber tissue with 8 drops of Polysilazane | 3 |
| 4 | None | 0.48 |

Pull-off bonding strength was measured for the hybrid composites with different transition layers. As can be seen from this data, hybrid composites with a transition layer have higher pull-off bonding strength than the one without a transition layer. While not intending to be bound by a particular theory, it is believed that the transition layer is effective to improve the bonding strength between the ceramic composites and the polymer matrix. In addition, it appears that the ceramic volume fraction in the transition layer influences the bonding strength. Low, medium and high ceramic volume in the transition layer were tested (sample nos. 1, 2, and 3, respectively) and a medium ceramic volume in the transition layer had the highest bonding strength.

Next, confocal images of the surface morphology after the pull-off measurement were taken for each of samples 1-4, as shown in FIGS. 30A-D, respectively. These figures show four different failure modes. As can be seen from FIG. 30A, when the ceramic amount in the transition layer is low, there appear to be voids in the transition layer, and failure happens at the resin-ceramic interface, and only a minor amount of carbon fiber is exposed. As can be seen from FIG. 30B, when the ceramic amount in the transition layer is at an intermediate amount, the sample breaks at the resin-ceramic interface in some parts and at the resin-carbon fiber interface in other areas. As can be seen from FIG. 30C, when the ceramic amount in the transition layer is at a high amount, the sample breaks at the interface between the resin and carbon fiber. In contrast, as can be seen from FIG. 30D, a sample without a transition layer breaks at the CFRP region underneath the ceramic layer.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

We claim:

1. A method of forming a hybrid composite material comprising:
    placing a layer of a first flexible ceramic composite on a lay-up tooling surface, wherein the first flexible ceramic composite (i) comprises a ceramic and a sheet of a carbon nanotube network that has undergone strain-induced alignment, (ii) comprises a volume fraction of carbon nanotubes from 20% to 90%, and (iii) has a Young's Modulus of at least 100 GPa;
    applying a sheet of a pre-preg carbon fiber reinforced polymer on the flexible ceramic composite;

curing the flexible ceramic composite and the pre-preg carbon fiber reinforced polymer sheet together to form a hybrid composite material; and removing the hybrid composite material from the lay-up tooling surface, wherein the first flexible ceramic composite comprises an exterior surface of the hybrid composite material.

2. The method of claim 1, further comprising:

applying one or more sheets of non-woven carbon fiber tissue on the first flexible ceramic composite; and curing the first flexible ceramic composite and the carbon fiber tissue together to form a second flexible ceramic composite before applying the sheet of pre-preg carbon fiber reinforced polymer on the second flexible ceramic composite.

3. The method of claim 2, wherein the step of applying one or more sheets of non-woven carbon fiber tissue further comprises applying one or more ceramic precursors to the first flexible ceramic composite or to the one or more sheets of non-woven carbon nanotube tissue before curing the first flexible ceramic composite and the carbon nanotube tissue.

4. The method of claim 1, further comprising applying a release agent to the lay-up tooling surface before placing thereon the layer of a flexible ceramic composite.

5. The method of claim 1, wherein the curing occurs over a period from about 1 hour to 48 hours.

6. The method of claim 1, wherein the curing is conducted at a temperature from about 100° C. to about 1500° C.

7. The method of claim 1, wherein the first flexible ceramic composite has a coefficient of thermal expansion that is from about 80% to about 120% of the coefficient of thermal expansion of the pre-preg carbon fiber reinforced polymer.

8. The method of claim 1, wherein the volume fraction of carbon nanotubes in the hybrid composite material is from about 40% to about 70%.

9. The method of claim 1, wherein the ceramic material comprises silicon carbonitride, silicon aluminum carbonitride, or a combination thereof.

10. The method of claim 1, wherein the carbon nanotubes of the carbon nanotube network comprise multi-walled carbon nanotubes.

11. The method of claim 1, wherein the hybrid composite material has a tensile strength of at least about 500 MPa.

12. The method of claim 1, wherein the hybrid composite material has an electrical conductivity of at least about $3 \times 10^6$ S·m$^{-1}$.

13. The method of claim 1, wherein the first flexible ceramic composite is produced by a process that comprises pyrolysis of a ceramic precursor, which comprises liquid polysilazane, that has been impregnated into the carbon nanotube network that has undergone strain-induced alignment.

* * * * *